US012617390B2

(12) United States Patent
Omari et al.

(10) Patent No.: US 12,617,390 B2
(45) Date of Patent: May 5, 2026

(54) PATH GENERATION BASED ON PREDICTED ACTIONS

(71) Applicant: Motional AD LLC, Boston, MA (US)

(72) Inventors: Sammy Omari, Pittsburgh, PA (US); Kevin C. Gall, Dover, NH (US); Juraj Kabzan, Boston, MA (US); Hans Andersen, Singapore (SG); Bence Cserna, Nahant, MA (US); Scott Drew Pendleton, Singapore (SG)

(73) Assignee: Motional AD LLC, Boston, MA (US)

( * ) Notice: Subject to any disclaimer, the term of this patent is extended or adjusted under 35 U.S.C. 154(b) by 36 days.

(21) Appl. No.: 17/814,505

(22) Filed: Jul. 22, 2022

(65) Prior Publication Data

US 2024/0025395 A1    Jan. 25, 2024

(51) Int. Cl.
| | |
|---|---|
| *B60W 30/09* | (2012.01) |
| *B60W 10/04* | (2006.01) |
| *B60W 10/18* | (2012.01) |
| *B60W 10/20* | (2006.01) |
| *B60W 30/095* | (2012.01) |

(Continued)

(52) U.S. Cl.
CPC ............ *B60W 30/09* (2013.01); *B60W 10/18* (2013.01); *B60W 30/0953* (2013.01); *B60W 30/0956* (2013.01); *B60W 60/0015* (2020.02); *B60W 60/0027* (2020.02); *G06V 20/58* (2022.01); *B60W 10/04* (2013.01); *B60W 10/20* (2013.01);

(Continued)

(58) Field of Classification Search
None
See application file for complete search history.

(56) References Cited

U.S. PATENT DOCUMENTS

| | | |
|---|---|---|
| 9,120,484 B1 | 9/2015 | Ferguson et al. |
| 9,669,827 B1 * | 6/2017 | Ferguson .......... B60W 60/0027 |

(Continued)

OTHER PUBLICATIONS

Cho, K. et al., "Deep Predictive Autonomous Driving Using Multi-Agent Joint Trajectory Prediction and Traffic Rules", 2019 IEEE/RSJ International Conference on Intelligent Robots and Systems (IROS), Nov. 4-8, 2019, pp. 2076-2081.

(Continued)

*Primary Examiner* — James J Lee
*Assistant Examiner* — Andrew Sang Kim
(74) *Attorney, Agent, or Firm* — Knobbe, Martens, Olson & Bear, LLP

(57)    ABSTRACT

Provided are methods and systems for semantic behavior filtering for prediction improvement. A method for operating an autonomous vehicle is provided. The method includes obtaining, by at least one processor, semantic image data associated with an environment in which an autonomous vehicle is operating. The method includes determining, by the at least one processor, at least one agent in the environment. The method includes determining a predicted action for the at least one agent. The method includes determining an agent predicted path for the at least one agent. The method includes determining a vehicle path of the autonomous vehicle. The method includes determining a predicted collision of the at least one agent and the autonomous vehicle. The method includes simulating actions to avoid the predicted collision. The method includes categorizing the predicted collision as a primary predicted collision based on the simulating actions.

20 Claims, 13 Drawing Sheets

(51) Int. Cl.
B60W 60/00      (2020.01)
G06V 20/58      (2022.01)

(52) U.S. Cl.
CPC ............... *B60W 2554/4026* (2020.02); *B60W 2554/4029* (2020.02)

(56)             References Cited

U.S. PATENT DOCUMENTS

| | | | |
|---|---|---|---|
| 10,782,693 | B2 | 9/2020 | Zhang et al. |
| 11,155,259 | B2 | 10/2021 | Yao et al. |
| 11,527,073 | B2 | 12/2022 | Choi et al. |
| 11,535,248 | B2 | 12/2022 | Phan et al. |
| 11,554,785 | B2 | 1/2023 | Siddiqui et al. |
| 11,703,869 | B2 | 7/2023 | Beller |
| 12,420,830 | B2 | 9/2025 | Omari et al. |
| 2013/0274986 | A1* | 10/2013 | Trepagnier .......... G05D 1/0248 |
| | | | 701/26 |
| 2017/0291602 | A1* | 10/2017 | Newman ............... B60W 10/18 |
| 2017/0297568 | A1* | 10/2017 | Kentley ............... G05D 1/0291 |
| 2018/0005407 | A1 | 1/2018 | Browning et al. |
| 2018/0032082 | A1 | 2/2018 | Shalev-Shwartz et al. |
| 2021/0046924 | A1* | 2/2021 | Caldwell .............. B60W 30/09 |
| 2021/0304018 | A1* | 9/2021 | Usman ................ G06F 11/3409 |
| 2022/0126821 | A1* | 4/2022 | Oyaizu ................. B60W 30/08 |
| 2022/0185323 | A1 | 6/2022 | Dolben et al. |
| 2022/0300001 | A1 | 9/2022 | Gayaka et al. |
| 2022/0379911 | A1* | 12/2022 | Carr ...................... B60W 30/12 |
| 2023/0256999 | A1* | 8/2023 | Donderici .......... B60W 30/085 |
| | | | 701/301 |
| 2024/0025443 | A1 | 1/2024 | Omari et al. |
| 2024/0025444 | A1 | 1/2024 | Omari et al. |

OTHER PUBLICATIONS

Colyar, J. et al., "US Highway 101 Dataset", NG SIM, Fact Sheet, U.S. Department of Transportation—Federal Highway Administration, Jan. 2007, in 3 pages. URL: https://www.fhwa.dot.gov/publications/research/operations/07030/07030.pdf.

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

International Search Report and Written Opinion received for PCT Application No. PCT/US2023/070718, mailed Nov. 3, 2023.

International Preliminary Report on Patentability received for PCT Application No. PCT/US2023/070718, mailed Feb. 6, 2025.

\* cited by examiner

600

602 Obtain Semantic Image Data

604 Identify Agents in Environment

606 Classify Primary/Secondary Agents

608 Generate Vehicle Path based on Primary Agents

610 Control Vehicle based on Vehicle Path

PATH GENERATION BASED ON PREDICTED ACTIONS

BACKGROUND

Autonomous vehicles can use a number of methods and systems for determining a trajectory for the autonomous vehicle. However, these methods and systems can require high computational power, which can lead to inefficient computation. Further, the methods and systems can slow the reaction time of the autonomous vehicle, which can lead to real-world complications.

DETAILED DESCRIPTION

Figure 1:
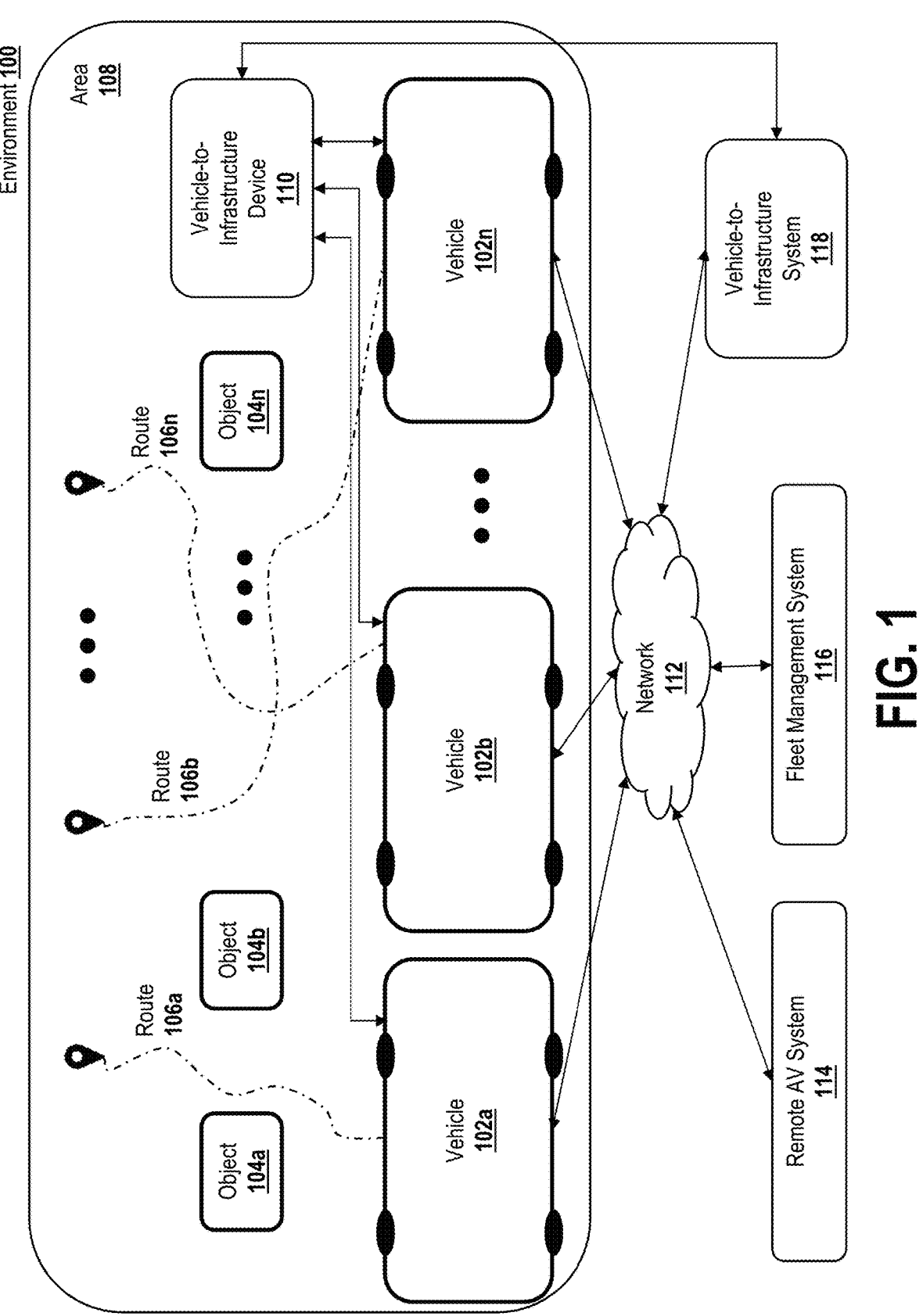
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement semantic behavior filtering for prediction improvement. Prediction engines can be used to predict actions of agents in a scene (or vehicle scene). In some cases, however, prediction engines can be error prone and/or generate low quality, or unlikely, predictions for a particular vehicle scene. For example, prediction engines may expend compute resources generating predictions for agents that are unlikely to affect an autonomous vehicle and/or predict unrealistic actions by agents. Such prediction engines may make predictions based on possible behaviors as opposed to predictions based on likely behaviors. Predictions based on possible behaviors that are not likely can cause inefficient or unsafe scenarios in a given vehicle scene.

To address these issues, a system can remove or filter out low quality predictions. In some cases, the system can filter agents based on contextual information before requesting a prediction engine to generate predictions for agents in a scene. For example, the system can filter out vehicles that are behind a stop light or stop sign so that a prediction engine does not expend resources predicting what those vehicles will do. Filtering out agents prior to determining predictions can reduce compute resources used by the vehicle to determine its path through a scene. In some cases, the system can filter the agents after requesting the predictions from the prediction engine to consider predicted actions when filtering.

Furthermore, the system can filter some or all predictions for a particular agent based on contextual information in the scene. For example, the system can filter out predictions that a pedestrian walking parallel to the street will abruptly change directions and run into the street. Filtering out low quality predictions can reduce the compute resources used by the vehicle to determine its path through a scene and/or reduce the likelihood that the vehicle will take an unsafe action (e.g., abrupt braking) based on a low-quality prediction.

In addition, the system can process a scene to determine that a collision is likely to occur. This can include determining that a collision with another object is likely to occur regardless of whether the vehicle speeds up or slows down. In some such cases, the system can take steps to mitigate damage, based on the determination that a collision is likely to occur. In some cases, the steps can include accelerating. For example, a vehicle may accelerate to adjust the location of the vehicle at which an impact is likely to occur. By virtue of the implementation of systems, methods, and computer program products described herein, techniques for semantic behavior filtering for prediction improvement can be accomplished. Some of the advantages of these techniques include reduced compute resources to determine a path, ability to determine a path in less time (i.e., better responsiveness) and with fewer compute resources, the ability to expend compute resources on higher quality predictions to achieve more efficient paths, and the ability to reduce damage during a collision.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
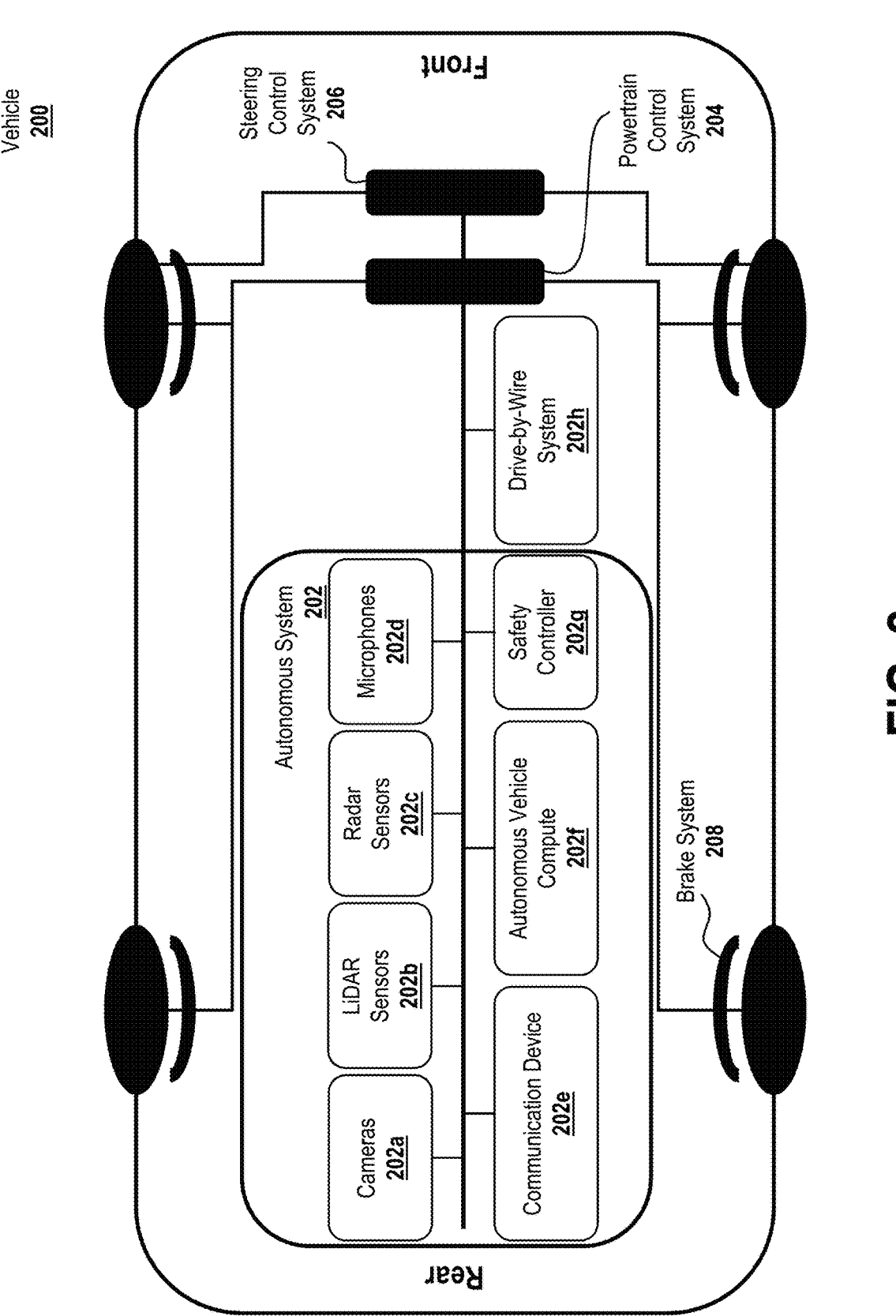
FIG. 2 is a diagram of one or more systems of a vehicle including an autonomous system.

Referring now to FIG. 2, vehicle 200 (which may be the same as, or similar to vehicle 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
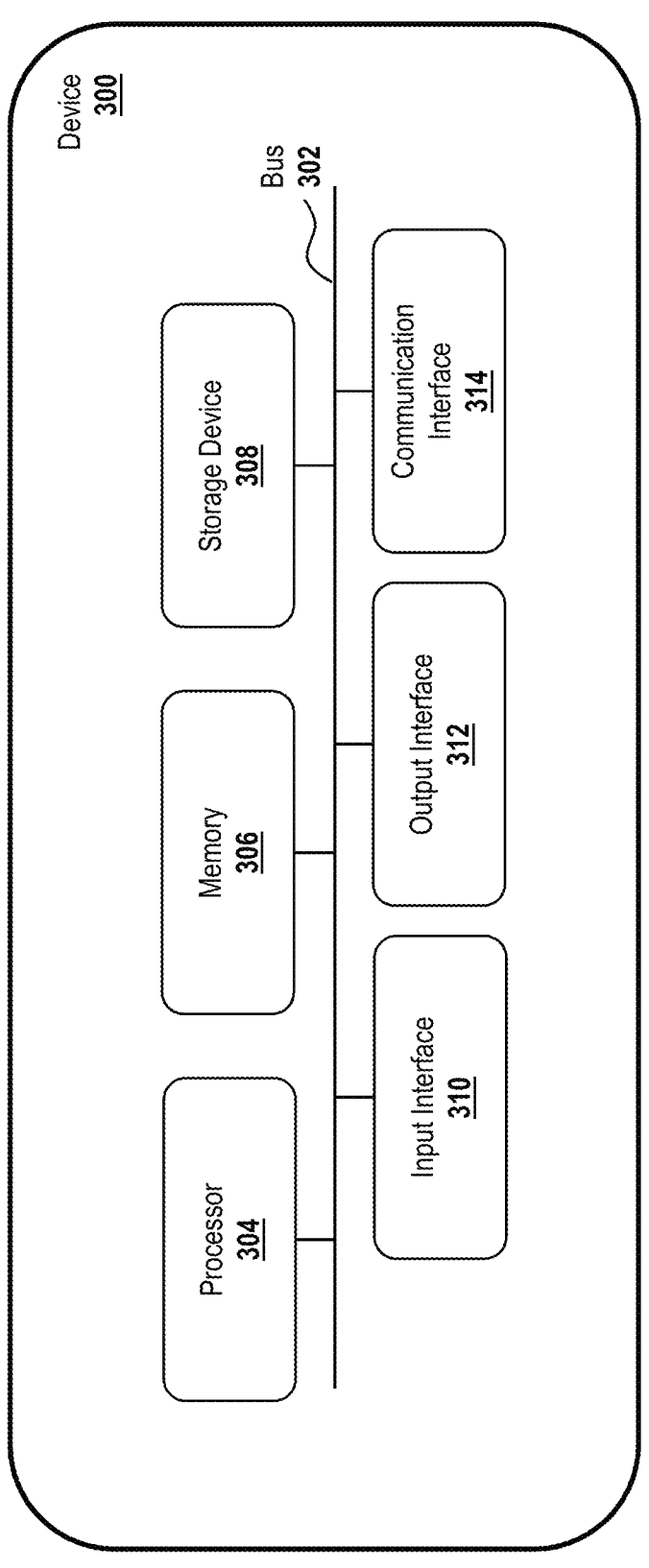
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a Charge-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202*f,* and/or safety controller 202*g* via a bus (e.g., a bus that is the same as or similar to bus 302 of FIG. 3). Radar sensors 202*c* include a system configured to transmit radio waves (either pulsed or continuously). The radio waves transmitted by radar sensors 202*c* include radio waves that are within a predetermined spectrum In some embodiments, during operation, radio waves transmitted by radar sensors 202*c* encounter a physical object and are reflected back to radar sensors 202*c.* In some embodiments, the radio waves transmitted by radar sensors 202*c* are not reflected by some objects. In some embodiments, at least one data processing system associated with radar sensors 202*c* generates signals representing the objects included in a field of view of radar sensors 202*c.* For example, the at least one data processing system associated with radar sensor 202*c* generates an image that represents the boundaries of a physical object, the surfaces (e.g., the topology of the surfaces) of the physical object, and/or the like. In some examples, the image is used to determine the boundaries of physical objects in the field of view of radar sensors 202*c.*

Microphones 202*d* includes at least one device configured to be in communication with communication device 202*e,* autonomous vehicle compute 202*f,* and/or safety controller 202*g* via a bus (e.g., a bus that is the same as or similar to bus 302 of FIG. 3). Microphones 202*d* include one or more microphones (e.g., array microphones, external microphones, and/or the like) that capture audio signals and generate data associated with (e.g., representing) the audio signals. In some examples, microphones 202*d* include transducer devices and/or like devices. In some embodiments, one or more systems described herein can receive the data generated by microphones 202*d* and determine a position of an object relative to vehicle 200 (e.g., a distance and/or the like) based on the audio signals associated with the data.

Communication device 202*e* includes at least one device configured to be in communication with cameras 202*a,* LiDAR sensors 202*b,* radar sensors 202*c,* microphones 202*d,* autonomous vehicle compute 202*f,* safety controller 202*g,* and/or DBW (Drive-By-Wire) system 202*h.* For example, communication device 202*e* may include a device that is the same as or similar to communication interface 314 of FIG. 3. In some embodiments, communication device 202*e* includes a vehicle-to-vehicle (V2V) communication device (e.g., a device that enables wireless communication of data between vehicles).

Autonomous vehicle compute 202*f* include at least one device configured to be in communication with cameras 202*a,* LiDAR sensors 202*b,* radar sensors 202*c,* microphones 202*d,* communication device 202*e,* safety controller 202*g,* and/or DBW system 202*h.* In some examples, autonomous vehicle compute 202*f* includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202*f* is the same as or similar to autonomous vehicle compute 400, described herein. Additionally, or alternatively, in some embodiments autonomous vehicle compute 202*f* is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202*g* includes at least one device configured to be in communication with cameras 202*a,* LiDAR sensors 202*b,* radar sensors 202*c,* microphones 202*d,* communication device 202*e,* autonomous vehicle computer 202*f,* and/or DBW system 202*h.* In some examples, safety controller 202*g* includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202*g* is configured to generate control signals that take precedence over (e.g., overrides) control signals generated and/or transmitted by autonomous vehicle compute 202*f.*

DBW system 202*h* includes at least one device configured to be in communication with communication device 202*e* and/or autonomous vehicle compute 202*f.* In some examples, DBW system 202*h* includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202*h* are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202*h.* In some examples, powertrain control system 204 includes at least one controller, actuator, and/or the like. In some embodiments, powertrain control system 204 receives control signals from DBW system 202*h* and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of [continue list in similar manner for all devices contemplated in FIGS. 1-3], and/or one or more devices of network 112 (e.g., one or more devices of a system of network 112). In some embodiments, one or more devices of vehicles 102 (e.g., one or more devices of a system of vehicles 102), [continue list in similar manner for all devices contemplated in FIGS. 1-3], and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In certain cases, the perception system 402 classifies the at least one physical object using at least one neural network trained to generate semantic image data from one or more image sensors. In some embodiments, perception system 402 transmits data associated with the classification of the physical objects (e.g., semantic image or semantic image data) to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202*b*) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4A:
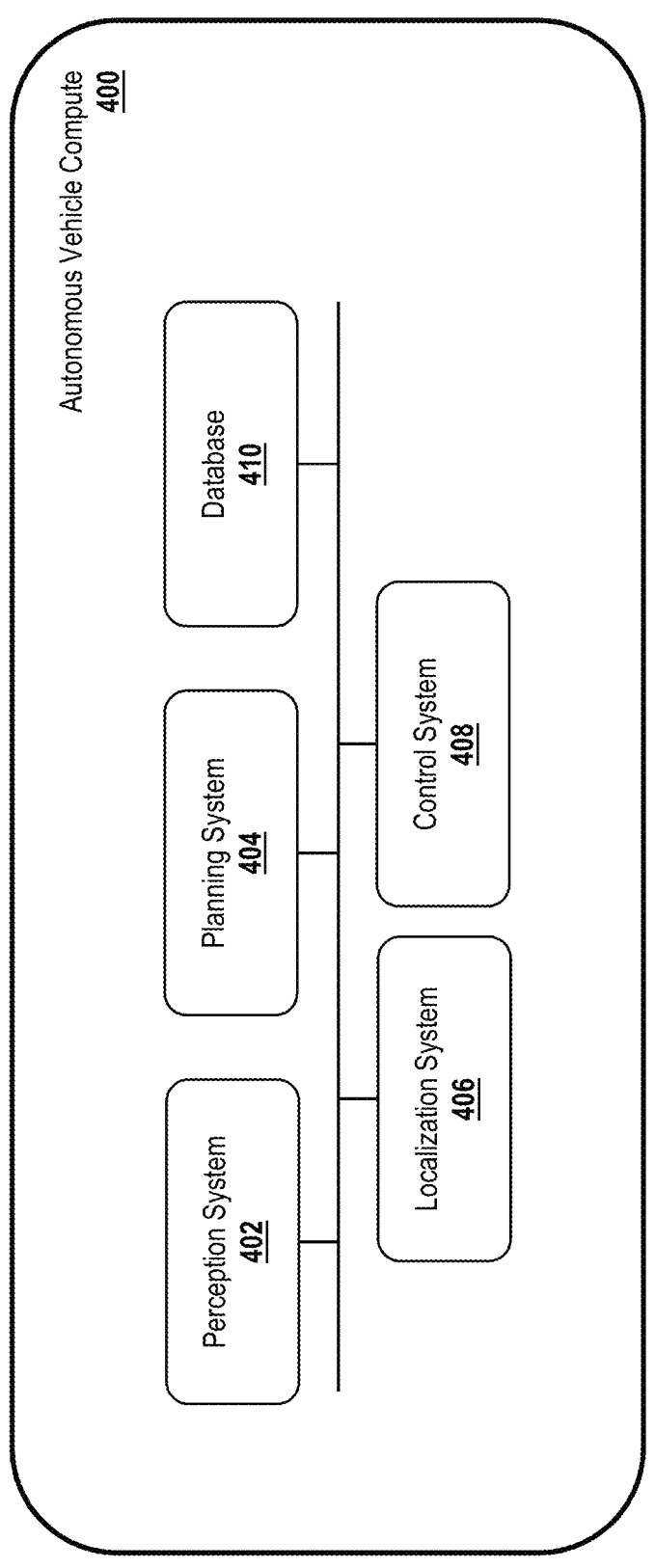
FIG. 4A is a diagram of certain components of an autonomous system.
Figure 4B:
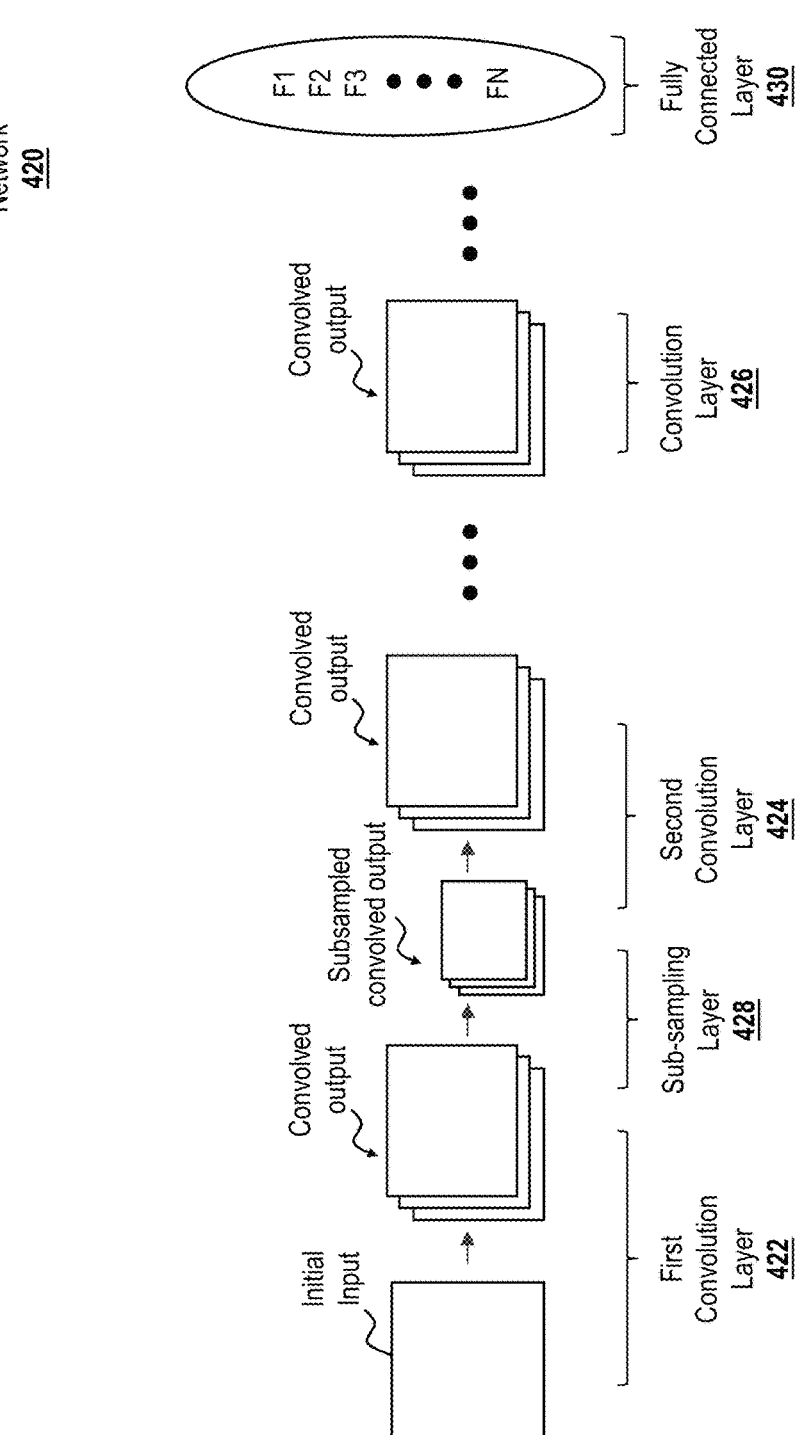
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 430 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
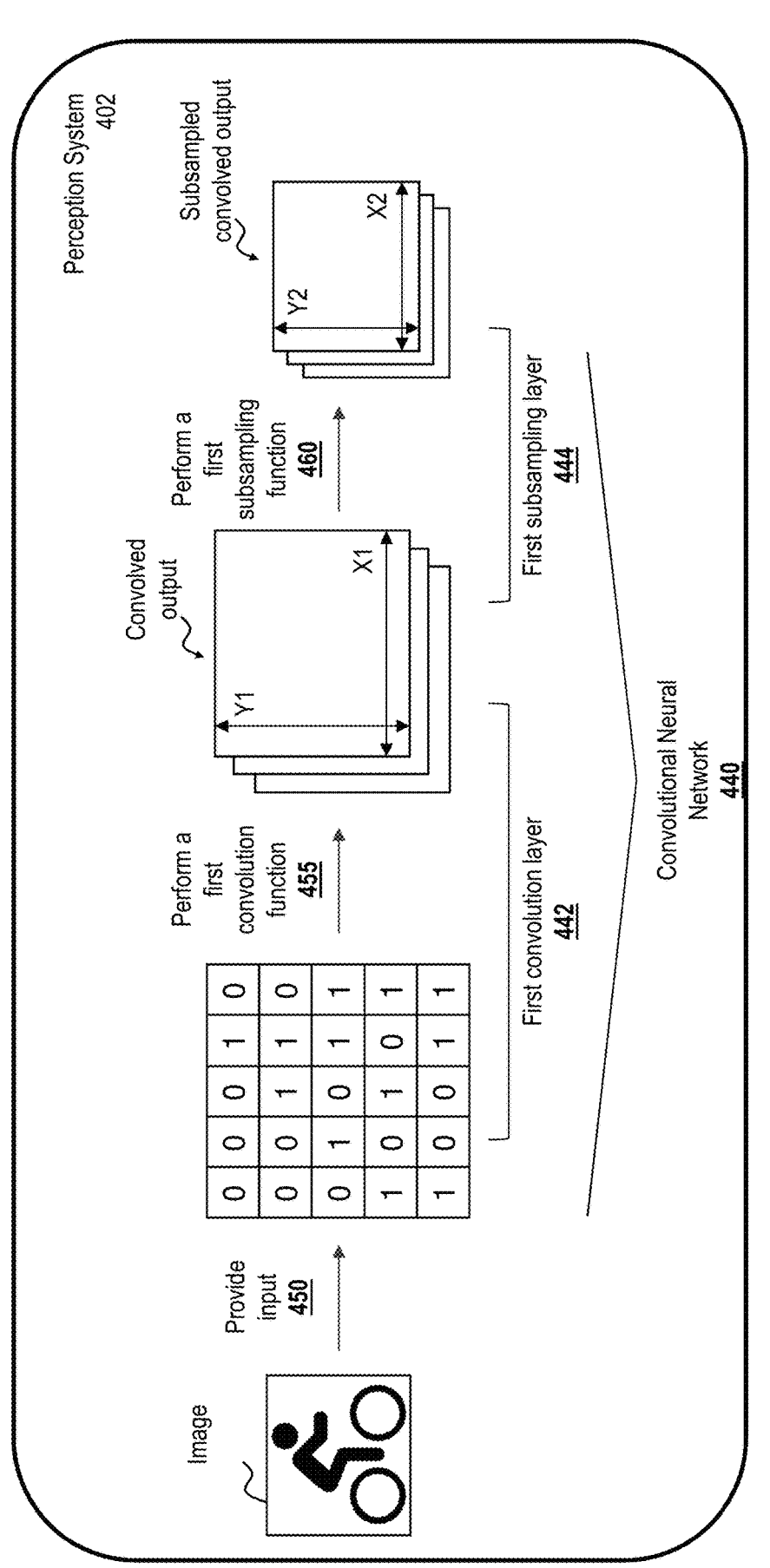
FIGS. 4C and 4D are a diagram illustrating example operation of a CNN.
Figure 4D:
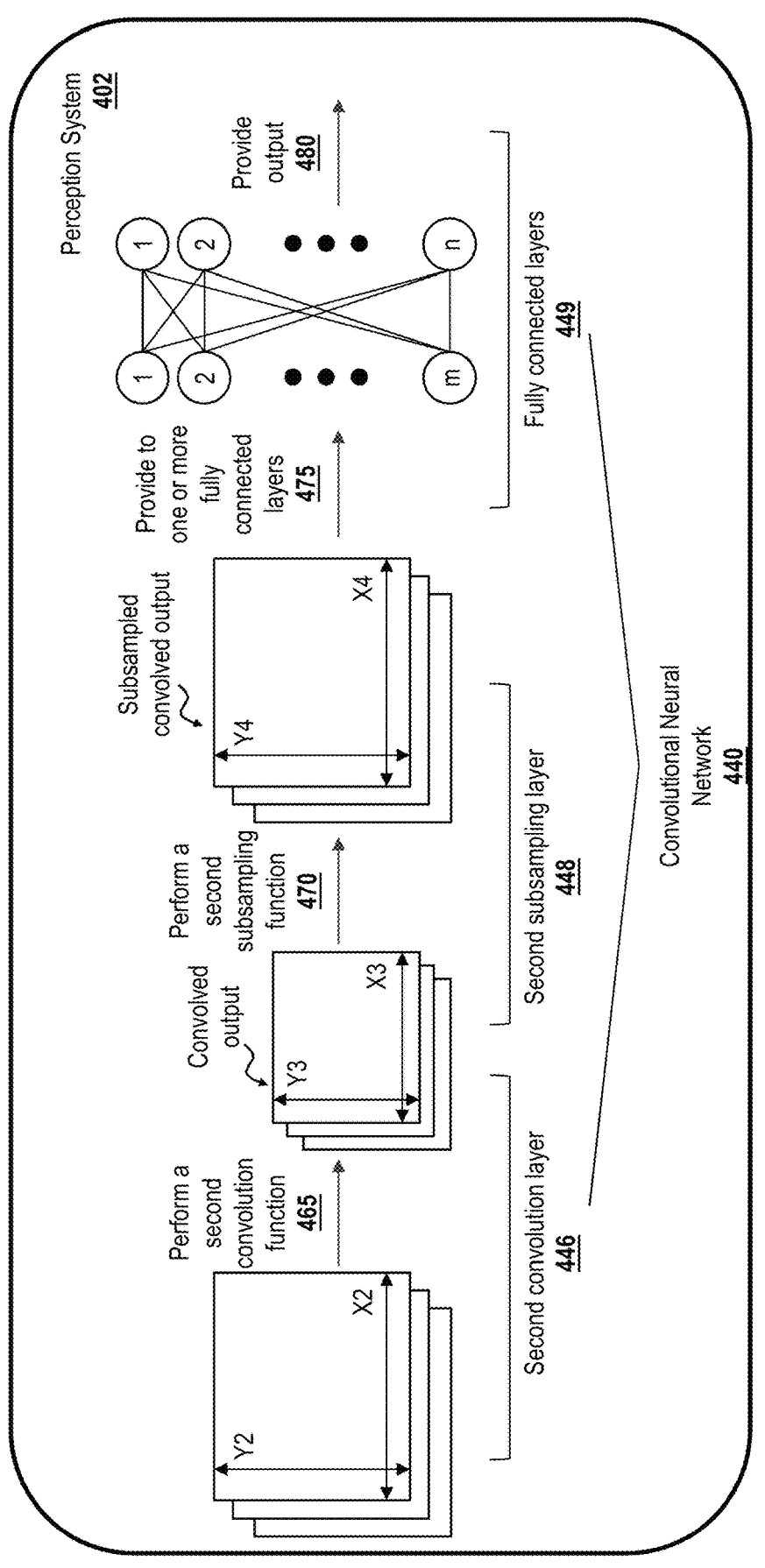

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 provid-ing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corre-sponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodi-ments, perception system 402 performs one or more opera-tions and/or provides the data associated with the prediction to a different system, described herein.

Prediction Filtering

As described herein, the planning system 404 can plan paths or trajectories for the vehicle 200 based on the objects in the vehicle's environment that are detected by the per-ception system 402. Some of the objects may be able to move or act independent of the vehicle 200 (also referred to herein as agents. For example, the agents can be another vehicle, a pedestrian, or a bicycle.

In some cases, the planning system 404 can use a pre-diction engine (not shown) to predict paths/trajectories for the agents in a scene. The prediction engine can generate predicted paths/trajectories for some or all agents in the scene. The predicted paths/trajectories can enable the plan-ning system 404 to better understand the scene and deter-mine possible paths/trajectories for the vehicle 200. The prediction engine can be configured to predict paths/trajec-tories of an agent based on a type of agent and/or movement of the agent. For example, the prediction engine may make a determination based on different types of agents that move differently, such as vehicles which may move faster than other agents; pedestrians, which may be less predictable than other agents; and bicycles, which may vary their speed based on elevation changes. The prediction engine can also make a determination about an agent based on the trajectory of surrounding agents. For example, the prediction engine may make a determination about the path of an agent based on additional traffic entering a lane in front of the agent.

In some examples, the prediction engine can be imple-mented using one or more neural networks, such as a CNN 440. For example, one trained neural network may be configured to generate predictions for vehicles and a second trained neural network may be configured to generate pre-dictions for pedestrians, etc., or one trained neural network can be configured to generate predictions for vehicle, pedes-trians, and/or bicycles, etc.

Generating predictions for agents can be time and/or compute resource intensive for the planning system 404. Moreover, the prediction engine may generate predictions for agents that have a low probability of moving or agents that should not move based on the context of the scene (e.g., vehicles behind a traffic light). In addition, some predictions for a particular agent may have a low probability of occur-ring (e.g., a person changing directions suddenly to jump into the street).

The low probability or low-quality predictions can use compute resources and increase the time for the planning system to determine its path/trajectory. Low quality predic-tions may also cause the vehicle 200 to take an unnecessary or unsafe action. For example, a low-quality prediction may indicate that a pedestrian may suddenly exit a sidewalk and enter an intersection into oncoming traffic. This low-quality prediction regarding the pedestrian may cause the vehicle 200 to decelerate quickly and/or stop in the middle of the intersection.

The planning system 404 can reduce time and compute resources spent on low probability predictions by identify-ing/categorizing primary agents and secondary agents based on context of the scene and/or semantic data associated with the scene. The planning system 404 can request predictions for primary agents from a prediction engine. The prediction engine can further generate predictions for the primary agents. The planning system 404 can process the predictions to identify primary predictions and secondary predictions, and use the primary predictions to generate one or more trajectories or paths. Additionally, the planning system 404 can relay instructions to the control system 408 to cause the vehicle 200 to travel along the determined path based on the primary predictions.

Figure 5A:
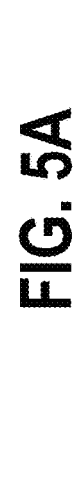
FIGS. 5A-5B are operation flow diagrams illustrating example filtering operations of the planning system.
Figure 5B:
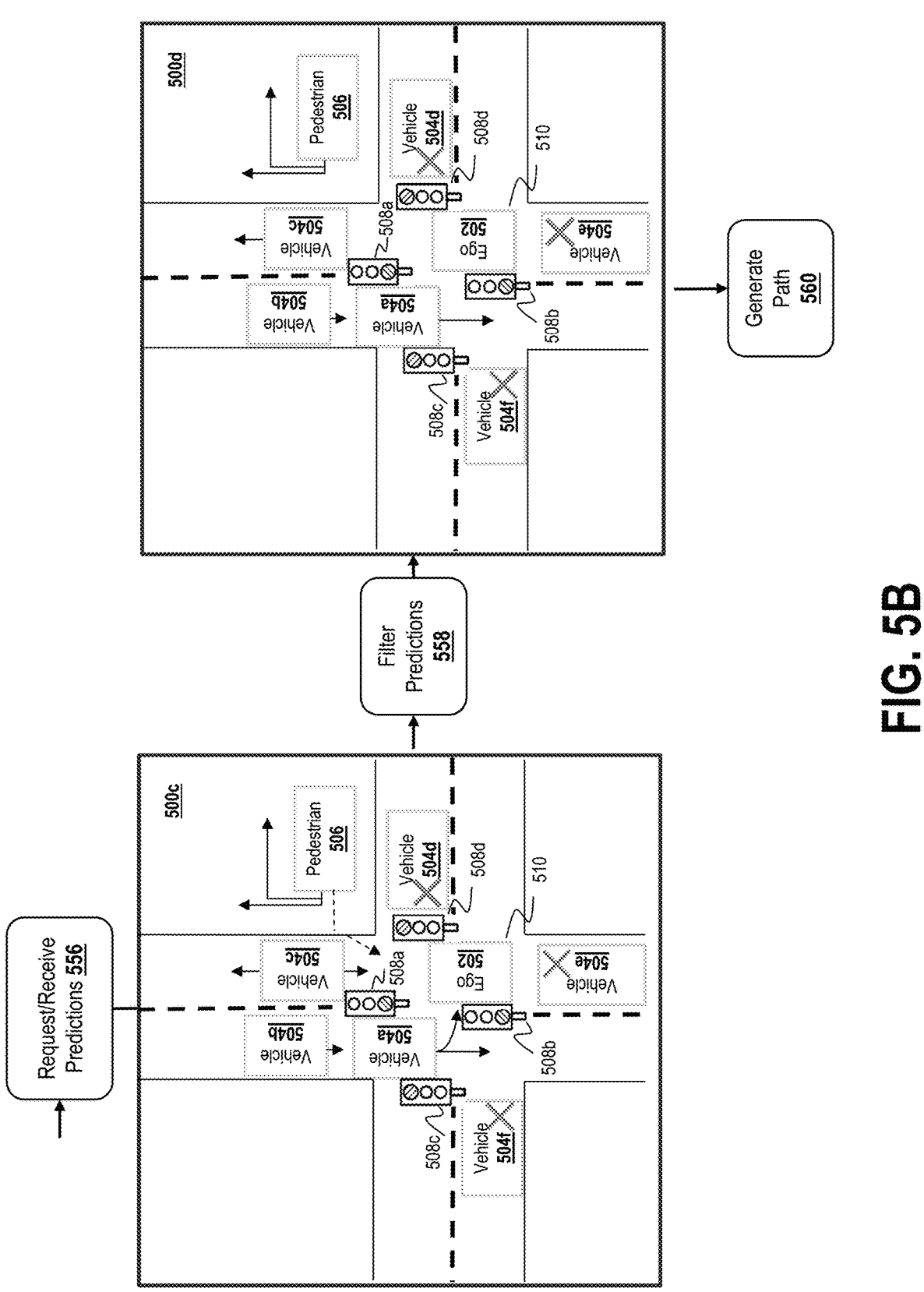

FIGS. 5A and 5B are operation flow diagrams illustrating example filtering operations of the planning system 404. At block 550, the planning system 404 receives semantic image data associated with a semantic image of a scene. The semantic image data can be generated by the perception system 402.

The semantic image can include rows of pixels. Some or all pixels in the semantic image can include semantic data, such as one or more feature embeddings. In certain cases, the feature embeddings can relate to one or more object attributes, such as but not limited to an object classification or class label identifying an object's classification (sometimes referred to as an object's class) (non-limiting examples: vehicle, pedestrian, bicycle, barrier, traffic cone, drivable surface, or a background, etc.). The object classification may also be referred to as pixel class probabilities or semantic segmentation scores. In some cases, the object classification for the pixels of an image can serve as compact summarized features of the image. For example, the object classifications can include a probability value that indicates the probability that the identified object classification for a pixel is correctly predicted.

In some cases, the feature embeddings can include one or more n-dimensional feature vectors. In some such cases, an individual feature vector may not correspond to an object attribute, but a combination of multiple n-dimensional feature vectors can contain information about an object's attributes, such as, but not limited to, its classification, width, length, height, etc. In certain cases, the feature embeddings can include one or more floating point numbers, which can assist a downstream model in its task of detection/segmentation/prediction.

Diagram 500a is a representation of at least a portion of semantic image data received by the planning system 404. In the illustrated example, the scene includes ego vehicle 502, which is an autonomous vehicle (similar to the vehicle 200 described herein at least with reference to FIG. 2), traveling through an intersection 510 with various objects identified, including vehicles 504a, 504b, 504c, 504d, 504e, 504f (individually or collectively referred to as vehicle(s) 504), a pedestrian 506, and traffic lights 508a, 508b, 508c, 508d (individually or collectively referred to as traffic light(s) 508). As described herein with reference to the semantic image, the aforementioned objects can be identified based on one or more feature embeddings of the semantic image indicating that a particular pixel forms part of a particular object and/or a probability that the identification is accurate.

At block 552, the ego vehicle 502 identifies primary agents and secondary agents. As described herein, agents can include objects that are able to move or act independent of the ego vehicle 502, such as other vehicles, pedestrians, and/or bicycles. In the illustrated example, the planning system 404 identifies the vehicles 504 and the pedestrian 506 as agents.

The planning system 404 can classify the identified agents as primary agents or secondary agents. In some cases, the primary agents can refer to agents that may interact with ego vehicle 502 based on contextual data associated with the scene. Secondary agents can refer to agents that are less likely to interact with ego vehicle 502 based on contextual data associated with the scene. For example, secondary agents can be agents behind traffic lights or traffic signs which indicate that the agents should not move. Secondary agents can also be agents that are positioned behind ego vehicle 502, agents that are too far away from ego vehicle 502 to interact with ego vehicle 502 within a relevant time period, or agents that cannot interact with ego vehicle 502 due to mobility characteristics (e.g., nearby stationary vehicles).

The planning system 404 can determine primary agents and secondary agents based on semantic context, including but not limited to distance from or location relative to the ego vehicle 502, position relative to the ego vehicle 502 and other objects in the scene (e.g., on other side of a cone or traffic light relative to ego vehicle 502), pose relative to the ego vehicle (facing towards or away from the ego vehicle 502 and/or its trajectory), speed, etc.

In some cases, the planning system 404 determines primary and/or secondary agents based on location data associated with the agents. For example, agents greater than a threshold distance away can be identified as secondary agents and agents less than a threshold distance away can be identified as primary agents. The threshold distance can be based on the speed of the agents and/or the ego vehicle 502. For example, if an agent is not moving, the threshold distance can be smaller than if the agent is moving. Similarly, the threshold distance for an agent traveling 50 mph can be greater than the threshold distance for an agent traveling 20 mph.

In certain cases, the planning system 404 can determine primary and/or secondary agents based on the location of the agents relative to other objects and/or relative to the ego vehicle 502 (or the trajectory of the ego vehicle 502). For example, if another object (e.g., pedestrian, crosswalk, barrier and/or traffic signal, such as a traffic sign or traffic light) is between an agent and the ego vehicle 502 or the trajectory of the ego vehicle 502, the planning system 404 can determine that the agent is a secondary agent. Conversely, if no object is between the agent and the ego vehicle 502, the planning system 404 can determine that the agent is a primary agent. As another example, if the agent (e.g., another vehicle or a bicycle) is behind or to the side of the ego vehicle 502 (and traveling in the same direction), the planning system 404 can determine that the agent is a secondary agent. If an agent is front of the ego vehicle 502 (and traveling in the same or opposite direction), the planning system 404 can determine that the agent is a primary agent.

In some cases, the planning system 404 can determine primary and/or secondary agents based on the pose of the agent relative to the ego vehicle 502. For example, if an agent is facing away from the ego vehicle 502 and/or away from the trajectory of the ego vehicle 502, the planning system 404 can determine that the agent is a secondary agent. If the agent is facing the ego vehicle 502 and/or the trajectory of the ego vehicle 502, the planning system 404 can determine that the agent is a primary agent. In certain cases, the planning system 404 can consider the type, state, and/or pose of a relevant object in determining whether the agent is a primary or secondary agent. For example, if the object is a traffic light type that is facing the agent and has a red state, the planning system 404 can identify the agent as a secondary agent, whereas if the traffic light has a green state, the planning system 404 can identify the agent as a primary agent.

It will be understood that any one or any combination of the aforementioned criteria can be used to identify an agent as a primary agent or secondary agent. In some cases, the planning system 404 can first identify secondary agents within a vehicle scene, and then identify any remaining agents as primary agents (or vice versa).

As illustrated by diagram 500b, in the illustrated example ego vehicle 502 identifies vehicles 504a, 504b, 504c and pedestrian 506 as primary agents and identifies vehicles 504d, 504e, 504f as secondary agents (which together may be referred to as a secondary agent set). As described herein, the ego vehicle 502 can identify 504*d*, 504*f* as secondary agents based on their location behind the (red) traffic lights 508*c* and 508*d* (e.g., vehicles 504*d* and 504*f*). Ego vehicle 502 can identify vehicle 504*e* as a secondary agent based on its location behind ego vehicle 502. However, it will be understood that other context can be used to identify primary/secondary agents. In certain cases, ego vehicle 502 can identify secondary agents based on the semantic context. In the illustrated example, ego vehicle 502 determines that the remaining vehicles 504*a*, 504*b*, 504*c* (agents not identified as secondary agents) are primary agents.

With reference to FIG. 5B, at block 556, the planning system 404 determines predicted trajectories for primary agents. In some cases, the planning system 404 does not determine predicted trajectories for secondary agents.

In some cases, the planning system 404 determines the predicted trajectories by communicating with the prediction engine. For example, the planning system 404 can request the prediction engine to return one or more predicted trajectories for primary agents.

As described herein, the prediction engine can be implemented separate from the planning system 404 or as part of the planning system 404 and can generate one or more trajectories for each of the requested agents. Diagram 500*c* depicts example predictions by the prediction engine based on data received from the perception system 402.

In the illustrated example, the planning system 404 determines two predictions with respect to the vehicle 504*a* (e.g., the vehicle 504*a* will either travel straight or turn into ego vehicle 502), three predictions with respect to the pedestrian 506 (e.g., the pedestrian 506 will make a U-turn, turn right and away from the intersection, or turn left and into the intersection), one prediction with respect to vehicle 504*b* (e.g., the vehicle 504*b* will travel straight and forward), two predictions with respect to vehicle 504*c* (e.g., the vehicle 504*c* will travel straight and forward or straight and backward), and no predictions with respect to each of vehicles 504*d*-504*f* as these agents were identified as secondary agents. In 500*c* of FIG. 5, the prediction engine made seven predictions. It will be understood that the planning system 404 can determine fewer predictions, or more predictions based on the desired number of predictions and the capabilities of the prediction engine being used (e.g., memory, processor speed, etc.).

At block 558, the planning system filters the predictions or actions. As described herein, the planning system 404 can determine multiple predictions or actions for individual agents. Some of the predictions may have a high probability of occurring, while others do not. Moreover, the predictions that have a low probability of occurring may cause the ego vehicle 502 to react in an unsafe way. Accordingly, the planning system 404 can identify predictions as primary predications (also referred to herein as primary actions) or as secondary predictions (also referred to herein as secondary actions).

The planning system 404 can identify primary actions and secondary actions in a variety of ways. In some cases, the primary actions can be actions (or predictions) that have a high likelihood of happening and the secondary actions can be actions that have a low likelihood of happening. In some examples, the high likelihood and low likelihood are determined with respect to each other. As such, primary actions can be a particular number of actions that are more likely to happen than a set number of secondary actions. For example, the top two or three ranked predictions for each agent can be identified as primary actions and the remaining actions for the respective agent can be identified as secondary actions. In some cases, the likelihood of an action happening can be based on a probability assigned to the action by the prediction engine or planning system 404 and/or a ranking assigned to the action by the prediction engine and/or planning system 404. For example, when the planning system receives predictions from the prediction engine, the prediction engine can include a probability that a particular prediction (or action) will occur and/or include a ranking of the different predictions for a particular agent. The planning system 404 can use the probabilities and/or rankings to determine primary and secondary actions.

In some examples, the planning system can determine primary actions and secondary actions based on a probability threshold. For example, primary actions can be actions that have a probability of happening that satisfies the probability threshold. Secondary actions can be actions that have a probability of happening that does not satisfy a probability threshold. For example, a primary action can be an action that has a greater than ten percent probability of happening. A secondary action can be an action that has less than or equal to ten percent probability of happening.

In certain cases, the planning system can use one or more thresholds or criteria to determine whether an action is a primary action or a secondary action. In some cases, the planning system 404 can use a change direction threshold to determine whether an action is a primary action or a secondary action. For example, actions indicating that an agent may move backwards and/or change direction beyond a threshold amount (e.g., thirty degrees) can be identified as secondary actions. In some cases, the threshold degree for turning may vary based on a velocity of an agent. Accordingly, an agent's position, orientation, and/or velocity can be used by the planning system 404 to determine whether an action is a primary action or a secondary action. For example, if an agent is stopped, a backward action may not be identified as a secondary action, whereas if an agent is moving forward, a backward action may be identified as a secondary action. Similarly, the threshold degree for turning may be lower the higher the velocity of an agent such that two actions for different agents that have the same degree for turning may be classified as a primary or secondary action depending on the velocity of the respective agents.

In certain cases, the planning system 404 can determine primary and secondary actions based on a type of agent. In some cases, the planning system 404 can use different criteria to classify primary/secondary actions for vehicles than for pedestrians or bicycles. For example, the planning system 404 may determine that an action to move backwards for a pedestrian can be a primary action, but any action to move backward for a bicycle or vehicle is a secondary action. Similarly, planning system 404 may determine that an action to move sideways can be a primary action for a pedestrian or bicycle but is a secondary action for a vehicle. Similarly, if the planning system 404 uses a threshold degrees for turning to identify an action as a primary or secondary action, the planning system 404 can use a different threshold degrees for turning for a pedestrian, bicycle, and/or vehicle.

In some cases, the planning system 404 can determine primary actions and secondary actions based on a position and/or orientation of an agent relative to the ego vehicle 502. For instance, if an action indicates that an agent will change its direction to collide with the vehicle 502 and/or interfere with the path of the vehicle, the planning system 404 can identify the action as a secondary action. For example, if a pedestrian is identified as walking the same direction as the ego vehicle 502, an action indicating that the pedestrian is likely to abruptly change direction and enter the street can be identified as a secondary action. Similarly, an action indicating that vehicle 504a will change direction (turn) to collide with ego vehicle 502 can be identified as a secondary action.

In some cases, the planning system 404 can ignore secondary actions and plan a path based on the primary actions of primary agents. In some examples, the planning system 404 can categorize the agents that are predicted to have secondary actions as secondary agents and ignore them entirely. In other examples, the planning system can ignore the secondary actions of certain primary agents while considering primary actions of the certain primary agents.

Diagram 500d depicts five primary actions of the identified primary agents in the scene after secondary actions are filtered out. As noted in the diagram 500d, the number of predictions have been reduced relative to the number of predictions shown in diagram 500c. In the illustrated example of 500d, the planning system 404 identifies five actions as primary actions: one primary action for the vehicle 504a (traveling straight), two primary action for the pedestrian 506 (making a U-turn and turning right), and one primary action for each of the vehicles 504b and 504c (traveling straight). It will be understood that the planning system 404 can have fewer predictions, or more predictions based on the semantic data.

At block 560, the planning system 404 generates a path for the ego vehicle 502. As described herein, the planning system 404 can generate the path based on the primary actions of primary agents. In some cases, the planning system 404 can use one or more neural networks to generate a path through the scene based on the primary actions of primary agents.

Figure 6:
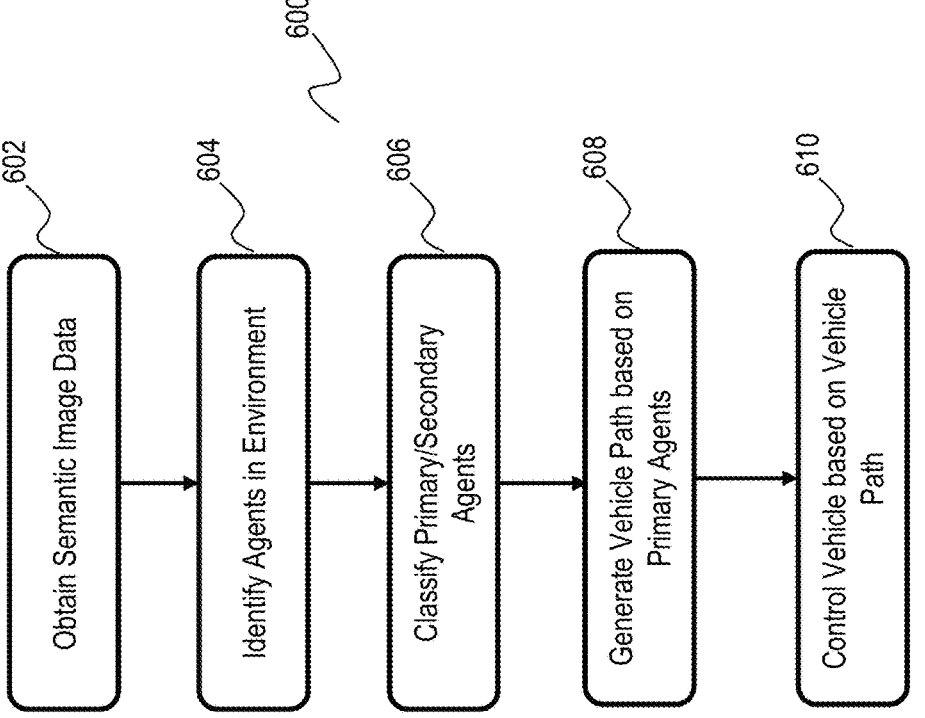
FIG. 6 is a flow diagram illustrating an example of a routine implemented by a planning system for controlling a vehicle based on a path generated using primary agents.

FIG. 6 is a flow diagram illustrating an example of a routine 600 implemented by a planning system 404 for controlling a vehicle based on a path generated using primary agents. The flow diagram illustrated in FIG. 6 is provided for illustrative purposes only. It will be understood that one or more of the steps of the routine illustrated in FIG. 6 may be removed or that the ordering of the steps may be changed. Furthermore, for the purposes of illustrating a clear example, one or more particular system components (e.g., planning system 404) are described in the context of performing various operations during each of the data flow stages. However, other system arrangements and distributions of the processing steps across system components may be used.

At block 602, the planning system 404 receives/obtains semantic image data from the perception system 402. In some examples, the planning system 404 receives data from the perception system 402 where the data has been associated with at least one physical object in an environment surrounding the vehicle 200 and classified. For example, as illustrated in FIGS. 5A-5B, the planning system 404 receives semantic image data associated with a semantic image for a scene from the perception system 402, which generates the semantic image from sensor data associated with at least one sensor, such as cameras 202a, lidar sensor 202b, radar sensor 202c, etc. As described herein at least with respect to FIGS. 5A-5B, the semantic image data can include data associated with at least one car, pedestrian, road features, and/or traffic signal, etc.

At block 604 the planning system 404 identifies agents in the environment based on the semantic image data received from the planning system 404. For example, as described herein, the semantic image data can indicate different types of objects within the semantic image. In some cases, the planning system 404 can identify agents based on the identified type of the corresponding object. For example, the planning system 404 can identify objects that can move independent of the vehicle, such as other vehicles, pedestrians, and/or bicycles as agents.

At block 606, the planning system 404 classifies primary and secondary agents. As described herein, the planning system 404 can identify agents based on one or more criteria, such as but not limited to distance from or location relative to the vehicle, position relative to the vehicle and other objects in the scene (e.g., on other side of a cone or traffic light relative to ego vehicle), pose relative to the ego vehicle (facing towards or away from the vehicle and/or its trajectory), speed of the agent, etc.

For example, the criteria can be a determination of whether an agent is likely to physically interact with the vehicle 200 based on the positions, trajectories, and mobility of the agent at a given time. If the agent is likely to interact with the vehicle 200, the planning system 404 can identify the agent as a primary agent. As such a set of primary agents can be a subset of the agents identified in the semantic image.

Similar to the determination of the primary agents, the processor 304 can identify secondary agents based on the set of criteria. For example, if an agent cannot interact with the vehicle (e.g., within a particular period of time), the planning system 404 can identify the agent as a secondary agent. As such, a set of secondary agents can be a subset of the agents identified in the semantic image. In some cases, the set of secondary agents can be mutually exclusive of the set of primary agents.

At block 608, the planning system 404 generates a path for the vehicle based on the primary agents. In some cases, the planning system 404 generates one or more trajectories, predications, and/or actions for the primary agents indicating where the primary agents might move to, and generates a path based on the generated predictions or actions. The generated path may include maintaining a particular heading and speed, slowing down, speeding up, veering left or right, etc. In some cases, the planning system can generate a path for a particular period of time, such as but not limited to three or six seconds. For example, the planning system 404 can plan an intended path for the vehicle for six consecutive seconds if the generated predictions for the primary agents prove to be accurate (or happen). If the generated predictions prove inaccurate or additional information is obtained, the planning system 404 can generate an alternative path. Moreover, it will be understood that the planning system 404 can generate multiple paths multiple times a second and select different paths depending on the dynamically changing environment in which the vehicle operates.

At block 610 the planning system 404 transmits instructions to control at least one of an autonomous system 202, powertrain control system 204, steering control system 206, and brake system 208 to cause the vehicle 200 to follow the path. For example, the planning system 404 can send instructions to the powertrain control system 204 to accelerate and cause the vehicle 200 to avoid colliding with an agent. The planning system 404 can send instructions to the steering control system 206 to cause the vehicle 200 to navigate around an agent. The planning system 404 can further send instructions to the brake system 208 to stop the vehicle 200 before it collides with an agent.

It will be understood that fewer, more, or different blocks can be used in routine 600. Moreover, one or more blocks can be rearranged or performed concurrently or in parallel. In some cases, one or more blocks of the routine can be repeated multiple times.

Figure 7:
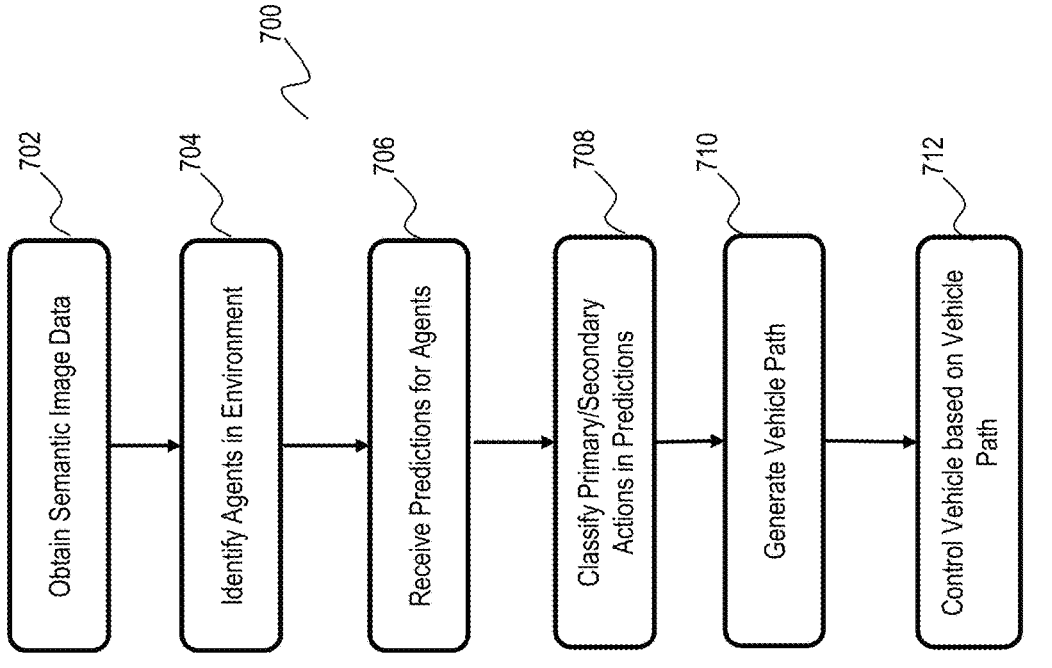
FIG. 7 is a flow diagram illustrating an example of a routine implemented by a planning system for controlling a vehicle based on a path generated using primary actions.

FIG. 7 is a flow diagram illustrating an example of a routine 700 implemented by a planning system 404 for controlling a vehicle based on a path generated using primary agents and primary actions. The flow diagram illustrated in FIG. 7 is provided for illustrative purposes only. It will be understood that one or more of the steps of the routine illustrated in FIG. 6 may be removed or that the ordering of the steps may be changed. Furthermore, for the purposes of illustrating a clear example, one or more particular system components (e.g., planning system 404) are described in the context of performing various operations during each of the data flow stages. However, other system arrangements and distributions of the processing steps across system components may be used.

At block 702, the planning system 404 receives/obtains semantic image data from the perception system 402, as described herein at least with respect to FIG. 6.

At block 704 the planning system 404 identifies agents in the environment based on the semantic image data obtained by the perception system 402 as described herein at least with respect to FIG. 6.

At block 706, the planning system 404 obtains/receives predictions for agents based on the environment around the vehicle 200 and based on the agents identified in the environment. In some cases, the predictions can be for agents identified as primary agents (and not for agents identified as secondary agents). In some examples, the prediction can be made by the prediction engine, based on the trajectory and types of agents identified at block 704. In some examples the prediction can be made within the planning system 404 as described above. In some examples the prediction can be made by a processor or trained neural network remote from the planning system 404, within the vehicle 200, or remote from the vehicle 200. In some cases, the planning system 404 can obtain/receive multiple predictions for a particular (primary) agent, multiple (primary) agents, or each (primary) agent.

At block 708, the planning system 404 classifies primary and secondary actions. As described herein at least with respect to FIGS. 5A-5B, the planning system 404 can classify, determine, and/or identify the primary and secondary actions in a variety of ways. In some cases, the planning system can classify actions based on any one or any combination of a type of the agent, position and/or orientation of the agent relative to the planning system 404, velocity of the agent, probability that an action will occur, probability that an action will occur relative to other actions, etc.

In some cases, the primary actions can be actions (or predictions) that have a high likelihood of happening and the secondary actions can be actions that have a low likelihood of happening. In some examples, the high likelihood and low likelihood are determined with respect to each other. As such, primary actions can be a particular number of actions that are more likely to happen than a set number of secondary actions. For example, the top two or three ranked predictions for an agent can be identified as primary actions and the remaining actions for the respective agent can be identified as secondary actions.

In some cases, the likelihood of an action happening can be based on a probability assigned to the action by the prediction engine or planning system 404 and/or a ranking assigned to the action by the prediction engine and/or planning system 404. For example, when the planning system receives predictions from the prediction engine, the prediction engine can include a probability that a particular prediction (or action) will occur and/or include a ranking of the different predictions for a particular agent. The planning system 404 can use the probabilities and/or rankings to determine primary and secondary actions.

In some examples, the planning system 404 can determine primary actions and secondary actions based on a probability threshold. For example, primary actions can be actions that have a probability of happening that satisfies the probability threshold. Secondary actions can be actions that have a probability of happening that does not satisfy a probability threshold. For example, a primary action can be an action that has a greater than ten percent probability of happening. A secondary action can be an action that has less than or equal to ten percent probability of happening[L1].

As such, semantic data and semantic behavior data related to the vehicle scene can be used to remove low quality predictions from consideration during path planning. In some examples, the planning system 404 can transmit actions identified as secondary actions to a processing engine or a neural network to inform future predictions. As such, data generated from the classification or determination of primary and secondary actions, can be used to influence subsequent determinations.

At block 710, the planning system 404 generates a path for the vehicle 200 based on the primary actions. In some cases, the planning system 404 uses the primary actions to predict where corresponding agents will move to within the vehicle scene over a period of time. Based on the movement of the various agents, the planning system can generate a path for the vehicle 200 through the vehicle scene. In some cases, the planning system 404 generates a path according to one or more path planning policies or a path that satisfies one or more thresholds. For example, the planning system 404 can generate a path that satisfies a comfort threshold (e.g., no acceleration/deceleration greater than a threshold amount and/or no paths that result in a centripetal force greater than a threshold amount) and/or a safety threshold (e.g., no collisions, no leaving the road or drivable area, etc.). In some cases, the generated path may include maintaining a particular heading and speed, slowing down, speeding up, veering left or right, etc. In some cases, the planning system can generate a path for a particular period of time, such as but not limited to three or six seconds. For example, the planning system 404 can plan an intended path for the vehicle for six consecutive seconds if the primary actions for the (primary) agents prove to be accurate (or happen). If the generated predictions prove inaccurate or additional information is obtained, the planning system 404 can generate an alternative path. Moreover, it will be understood that the planning system 404 can generate multiple paths multiple times a second and select different paths depending on the dynamically changing environment in which the vehicle 200 operates.

In some cases, the path is a planned path that avoids collision with the agents in the vehicle scene and operates based on a desired set of priorities. For example, the path can be planned to minimize the amount of time traveled, or to minimize safety risk for the vehicle 200. For example, the path can be generated based at least in part on information regarding agents predicted to move into the path of the vehicle 200.

At block 712 the planning system 404 transmits instructions to control at least one of an autonomous system 202, powertrain control system 204, steering control system 206, and brake system 208 to cause the vehicle 200 to follow the path, as described herein at least with respect to FIG. 6.

It will be understood that fewer, more, or different blocks can be used in routine 600. Moreover, one or more blocks can be rearranged or performed concurrently or in parallel. In some cases, one or more blocks of the routine can be repeated multiple times.

Primary Collisions

As described herein, the perception system 402 can detect various objects or obstacles in a vehicle scene. In some scenarios, the planning system 404 may predict a collision between the vehicle 200 and an object. In response, the vehicle 200 can simulate $_{[M2]}$one or more actions that the vehicle 200 can take to avoid the collision. In some cases, the planning system 404 can determine that the predicted collision is a primary collision. In certain cases, the planning system 404 can determine that a predicted collision is a primary collision if the planning system 404 is unable to determine a path that would avoid the collision. For example, the perception system 402 may detect another vehicle entering a road from a blind driveway, or an animal or pedestrian unexpectedly dashing into the street directly in front of the vehicle 200. In response, the planning system can simulate one or more actions that the vehicle can take to avoid a collision with the vehicle, animal, or pedestrian that unexpectedly entered the path of the vehicle 200. In some cases, however, the planning system 404 may determine that the vehicle 200 is unable to brake, accelerate, or turn fast enough to avoid a collision given the momentum, braking power, and certain driving characteristics of the vehicle 200. As such, the planning system 404 can identify the collision as a primary collision and take appropriate action.

Based on a determination that a collision is a primary collision and/or is unavoidable, the planning system 404 can simulate one or more actions that the vehicle 200 can take to decrease damage to the vehicle 200 or object and/or increase safety. Based on the simulated actions, the planning system 404 can cause the vehicle 200 to take an action according to a collision mitigation policy.

Figure 8:
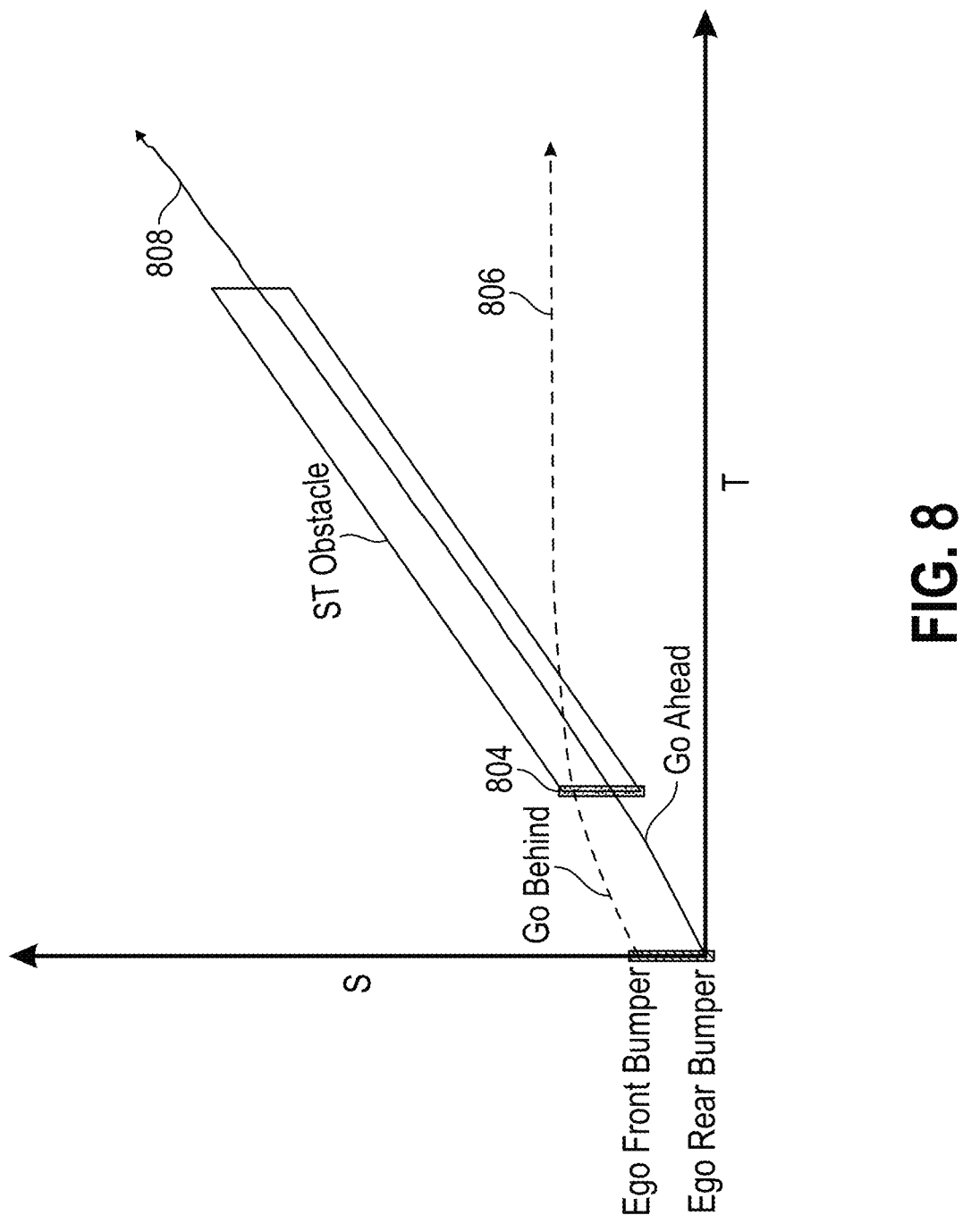
FIG. 8 is a position over time representation of an implementation of a process for semantic behavior filtering for prediction improvement in the case of an unavoidable collision.

FIG. 8 shows an example graph 800 illustrating a position (y-axis) over time (x-axis) of a vehicle 802 and an obstacle 804. In the illustrated example, the graph 800 shows simulated positions over time for the vehicle 802 when executing two collision avoidance actions to avoid the obstacle 804, however, it will be understood that fewer or more collision avoidance actions can be simulated and/or taken. In some examples, the obstacle 804 can be a vehicle, a pedestrian, a bicycle, or another obstacle that a vehicle may collide with during operation.

Line 806 illustrates a simulation of the position over time of the vehicle 802 if the vehicle 802 were to attempt to go behind the obstacle 804. Going behind the obstacle 804 can include at least one of maintaining speed of the vehicle 802, decelerating, or turning. Line 806 illustrates a simulation of the position over time of the vehicle 802 if the vehicle 802 were to attempt to go in front of the obstacle 804. Going in front of the obstacle 804 can include maintaining speed, accelerating, or turning. In the illustrated example, neither attempting to go in front of nor attempting to go behind the obstacle 804 will cause the vehicle 802 to avoid colliding with the obstacle 804. Accordingly, the planning system 404 can identify a predicted collision between the vehicle 802 and the obstacle 804 as a primary collision.

Based on the identification of the collision as a primary collision, the planning system 404 can analyze different scenarios for colliding with the obstacle 804. For example, the planning system 404 can determine a predicted location on the vehicle 200 of impact for the collision (e.g., near the front, the middle, or near the rear of the vehicle 200) and calculate the speed and force of impact as well as additional factors such as predicted angle of collision. Using the location of impact, speed, and/or force, the planning system 404 can determine damage predictions, injury predictions, or other relevant predictions that would result from the collision at the different locations on the vehicle 200.

Based on scenarios for colliding with the obstacle 804, the planning system 404 can select an action to perform based on a collision mitigation policy. The collision mitigation policy can indicate how to evaluate/prioritize possibilities of the collision. For example, a collision mitigation policy can indicate that the planning system 404 is to prioritize a minimal speed collision (e.g., reduce speed as much as possible), hitting an obstacle with a front or back of the car (e.g., speed up or slow down to collide with the object at a particular location on the vehicle 200), or hitting unoccupied vehicles or barriers instead of occupied vehicles or pedestrians. The planning system 404 can select the collision mitigation action to perform based on the damage predictions, injury predictions, or other relevant predictions in view of the collision mitigation policy. For example, if the collision mitigation policy is to hit the object with the front of the vehicle 200, the planning system can take relevant actions to hit the object with the front of the vehicle 200 rather than the side or back of the vehicle 200 In some examples, collision mitigation actions can include but are not limited to slowing down, speeding up, stopping, maintaining speed, turning, or various other actions that can affect a path/trajectory of a vehicle and the nature of a collision.

In some examples, the planning system 404 can use a position over time map to simulate scenarios for if the vehicle 200 were to attempt to avoid more than one obstacle. The simulation may determine that a collision with one obstacle is inevitable to avoid collision with another obstacle. For example, the vehicle 200 may determine that it should slow down to go behind an upcoming obstacle, but slowing down will cause an agent traveling closely behind the vehicle 200 to collide with the vehicle 200. As such, the planning system 404 can analyze different simulated scenarios based on alternative paths as described above. The planning system 404 can select an action to perform based on the scenarios, and the collision mitigation policy. In situations considering multiple collision options, collision mitigation policy may indicate that the planning system 404 is to determine the action based on a least consequential collision. For example, a collision with the agent behind the vehicle 200 may have a lower energy impact based on similar velocities of the agent and the vehicle 200. This lower energy impact may be desirable compared to a higher energy impact with an oncoming vehicle. In another example the planning system 404 can determine the action based at least in part on local ordinances that may favor a passenger of the vehicle that receives a collision from behind as opposed to the passenger of a vehicle that receives a head on collision.

Figure 9:
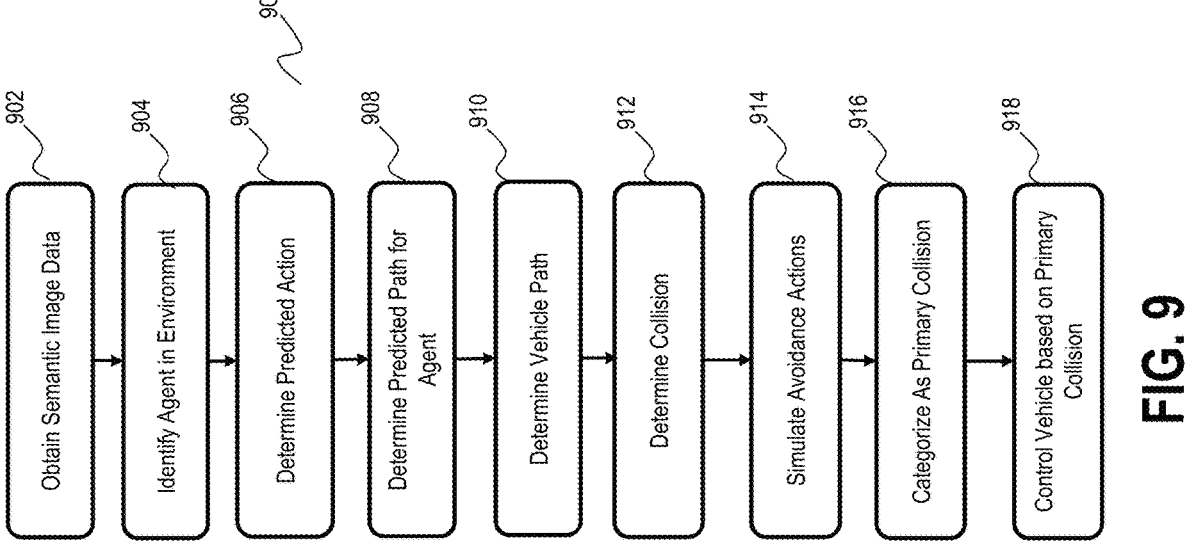
FIG. 9 is a flow diagram illustrating an example of a routine implemented by a planning system for semantic behavior filtering for prediction improvement in the case of an unavoidable collision.

FIG. 9 is a flow diagram illustrating an example of a routine 900 implemented by a planning system 404 for controlling a vehicle based on a path generated using primary agents. The flow diagram illustrated in FIG. 9 is provided for illustrative purposes only. It will be understood that one or more of the steps of the routine illustrated in FIG. 9 may be removed or that the ordering of the steps may be changed. Furthermore, for the purposes of illustrating a clear example, one or more particular system components (e.g., planning system 404) are described in the context of performing various operations during each of the data flow stages. However, other system arrangements and distributions of the processing steps across system components may be used.

At block 902, the planning system 404 obtains/receives data from the perception system 402, as described herein at least with respect to FIG. 6.

At block 904 the planning system 404 identifies agents in the environment based on the semantic image data received from the perception system 402 as described herein.

At block 906, the planning system 404 determines at least one predicted action for an agent in the environment. As described herein, in some cases, the at least one predicted action can be based on a possible trajectory or path of the agent. The predicted action can also be based at least in part on semantic behavior data. As described above, semantic behavior data can be based on considerations such as how agents are predicted to behave, safety thresholds, and regulatory considerations. In some cases, the planning system 404 can determine one or more predicted actions for agents identified as primary agents. In certain cases, as described herein, the planning system 404 can determine primary actions from a group of predicted actions.

At block 908 the planning system 404 determines a predicted path for the agent based on the predicted action of the agent. In certain cases, the planning system 404 determines a predicted path for the agent based on one or more primary actions. For example, the planning system can identify primary actions from a set of generated actions and use one of the primary actions to generate the predicted path for the agent. As described with respect to FIG. 8, the planning system 404 can plot a predicted path of an agent over time in a position over time map. For example, the planning system 404 can plot the predicted path of the agent in the environment, based on a surrounding environment, other agents, semantic data, and semantic behavior data mapping.

At block 910, the planning system 404 determines a path for the vehicle 200. As described herein, the path of the vehicle 200 can be a planned path based on a desired set of system priorities. For example, as described above, the path can be planned to minimize the distance traveled, or to maximize safety for the vehicle 200. In this example, the planning system 404 determines a path that is intended to avoid a collision.

At block 912 the planning system 404 predicts a collision will take place based on the predicted path for the agent and the determined path of the vehicle 200. For example, the planning system 404 can determine that an agent is traveling from a side road into the determined vehicle path at a velocity that will position the agent at a same location as the vehicle 200 at a given time. In another example, the planning system 404 may determine that a pedestrian has entered the determined path of the vehicle 200 at a velocity that will position the pedestrian at the same location as the vehicle 200 at a given time.

At block 914, the planning system 404 simulates avoidance actions for the vehicle 200 to avoid the collision with the obstacle. For example, the planning system 404 can plot a predicted path of the vehicle 200 over time in a position over time map (as shown in FIG. 8). The planning system 404 can further plot potential paths that include the avoidance actions for the vehicle 200 in the environment, based at least in part based on semantic data. In some cases, the avoidance actions can include but are not limited to increasing or decreasing velocity, veering left or right, etc.

At block 916, the planning system 404 categorizes the collision as a primary collision. As described herein at least with respect to FIG. 8, in a primary collision scenario, the planning system 404 determines that the vehicle 200 collision is likely to occur despite the avoidance actions. For example, the planning system 404 can determine that a collision is likely to occur regardless of whether the vehicle increases or decreases velocity, veer left or right, etc. As such, the planning system 404 determines that the collision is a primary collision. In some examples, the primary collision can correspond to an unavoidable collision due to physical constraints (e.g., based on the velocity of the vehicle and agent, etc.). In some examples, the primary collision is a collision that would increase risk of injury to passengers of the vehicle 200 if avoided. In some examples the primary collision is a collision that would cause a more severe or less desirable collision than an alternative collision (e.g., rear end, hit pedestrian, cyclist, etc.).

At block 918, the planning system 404 transmits vehicle control instructions based on the primary collision determination and path planning. In some cases, the planning system can control the vehicle according to a collision mitigation policy. As described herein, the collision mitigation policy can indicate priorities for the vehicle for a collision. In certain cases, the collision mitigation policy can indicate a preferred position for the vehicle collision, preferred velocity or preferred relative velocity, etc. For example, the collision mitigation policy can indicate that the vehicle should be positioned so that the collision occurs at the front, middle, or rear of the vehicle. As another example, the collision mitigation policy may indicate that vehicle should have a low velocity or low velocity relative to the velocity of the agent with which it will collide, etc. Accordingly, based on the collision mitigation policy can indicate, the planning system 404 may cause the vehicle to accelerate, decelerate, veer left/right, etc. For example, the planning system 404 may plot a path where the agent collides with the vehicle 200 at a specific point on the vehicle 200 that can minimize the results of the collision, etc.

The instructions cause at least one of an autonomous system 202, powertrain control system 204, steering control system 206, and brake system 208 to cause the vehicle 200 to follow the path, as described herein at least with respect to FIG. 6.

It will be understood that fewer, more, or different blocks can be used in routine 900. Moreover, one or more blocks can be rearranged or performed concurrently or in parallel. In some cases, one or more blocks of the routine can be repeated multiple times.

The flow diagrams illustrated in FIGS. 5A-7 and 9 are provided for illustrative purposes only. It will be understood that one or more of the steps of the routine illustrated in FIGS. 5A-7 and 9 may be removed or that the ordering of the steps may be changed. Moreover, it will be understood that any one or any combination of steps from 5A-7 and 9 may be combined. For example, the planning system 404 may obtain semantic image data (602), identify agents in the environment (604), classify primary/secondary agents (606), receive predictions for agents (706), classify primary/secondary actions (708), generate a vehicle path (608/710), and control vehicle based on the vehicle path (610/712). In addition, although described in terms of generating a path based on an agent in some cases, it will be understood that the planning system 404 can perform similar steps for multiple agents in an environment and can repeatedly generate vehicle paths based on the dynamic nature of the environment.

Furthermore, for the purposes of illustrating a clear example, one or more particular system components are described in the context of performing various operations during each of the data flow stages. However, other system arrangements and distributions of the processing steps across system components may be used.

In some embodiments, one or more of the steps described with respect to processes 500, 600, 700, and 900 are performed (e.g., completely, partially, and/or the like) by the planning system 404 or other systems of the vehicle 200. Additionally, or alternatively, in some embodiments one or more steps described with respect to processes 500, 600, 700, and 900 are performed (e.g., completely, partially, and/or the like) by another device or group of devices separate from or including the planning system 404 or other systems of the vehicle 200 such as a processor remote from the planning system 404 or other systems of the vehicle 200.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

EXAMPLES

Various example embodiments of the disclosure can be described by the following clauses:

Clause 1. A method for operating an autonomous vehicle, the method comprising: obtaining, by at least one processor, semantic image data associated with an environment in which an autonomous vehicle is operating; determining, by the at least one processor, a set of agents in the environment based on the semantic image data; determining a set of predicted actions for at least one primary agent of the set of agents; determining, from the set of predicted actions, a set of secondary predicted actions for the at least one primary agent, wherein the set of secondary predicted actions is determined for the at least one primary agent based on a location of the at least one primary agent and based on agent semantic behavior data associated with the at least one primary agent, wherein the agent semantic behavior data comprise logic-based rules and exceptions for predicted agent actions; determining, from the set of predicted actions, a set of primary predicted actions other than secondary predicted actions; and generating a path for the autonomous vehicle based on the set of primary predicted actions.

Clause 2. The method of clause 1, further comprising causing the autonomous vehicle to operate along the path for the autonomous vehicle.

Clause 3. The method of clause 1 or 2, wherein the set of agents comprise objects configured to move.

Clause 4. The method of any of clauses 1-3, wherein the set of agents further comprises a secondary agent set, wherein the secondary agent set comprises agents unlikely to interact with the autonomous vehicle.

Clause 5. The method of clause 4, wherein the secondary agent set comprises agents that will unavoidably interact with the autonomous vehicle.

Clause 6. The method of any of clauses 4-5, further comprising, transmitting the secondary agent set to a processing engine.

Clause 7. The method of any of clauses 4-6, further comprising, determining a second set of interaction parameters based at least in part on the secondary agent set.

Clause 8. The method of any of clauses 1-7, wherein the at least one primary agent is a pedestrian on a sidewalk.

Clause 9. The method of clause 8, wherein the pedestrian is following a predetermined path.

Clause 10. The method of clause 9, wherein the pedestrian is determined to be approaching an intersection between the predetermined path of the pedestrian and the path of the autonomous vehicle.

Clause 11. The method of clause 10, wherein the pedestrian is determined to collide with the autonomous vehicle.

Clause 12. The method of any of clauses 1-11, wherein generating a path for the autonomous vehicle further comprises determining a plurality of alternative paths for the autonomous vehicle.

Clause 13. The method of clause 12, wherein the alternative paths include an increased velocity during at least a portion of at least one of the alternative paths.

Clause 14. The method of clause 12 or 13, wherein the alternative paths include a decreased velocity during at least a portion of at least one of the alternative paths.

Clause 15. A system, comprising: at least one processor, and at least one non-transitory storage media storing instructions that, when executed by the at least one processor, cause the at least one processor to: obtain, by at least one processor, semantic image data associated with an environment in which an autonomous vehicle is operating; determine, by the at least one processor, a set of agents in the environment based on the semantic image data; determine a set of predicted actions for at least one primary agent of the set of agents; determine, from the set of predicted actions, a set of secondary predicted actions for the at least one primary agent, wherein the set of secondary predicted actions is determined for the at least one primary agent based on a location of the at least one primary agent and based on agent semantic behavior data associated with the at least one primary agent, wherein the agent semantic behavior data comprise logic-based rules and exceptions for predicted agent actions; determine, from the set of predicted actions, a set of primary predicted actions other than secondary predicted actions; and generate a path for the autonomous vehicle based on the set of primary predicted actions.

Clause 16. The system of clause 15, further comprising causing the autonomous vehicle to operate along the path for the autonomous vehicle.

Clause 17. The system of clause 15 or 16, wherein the set of agents further comprises a secondary agent set, and wherein the secondary agent set comprises agents unlikely to interact with the autonomous vehicle.

Clause 18. At least one non-transitory storage media storing instructions that, when executed by at least one processor, cause the at least one processor to: obtain, by at least one processor, semantic image data associated with an environment in which an autonomous vehicle is operating; determine, by the at least one processor, a set of agents in the environment based on the semantic image data; determine a set of predicted actions for at least one primary agent of the set of agents; determine, from the set of predicted actions, a set of secondary predicted actions for the at least one one primary agent, wherein the set of secondary predicted actions is determined for the at least one primary agent based on a location of the at least one primary agent and based on agent semantic behavior data associated with the at least one primary agent, wherein the agent semantic behavior data comprise logic-based rules and exceptions for predicted agent actions; determine, from the set of predicted actions, a set of primary predicted actions other than secondary predicted actions; and generate a path for the autonomous vehicle based on the set of primary predicted actions.

Clause 19. The at least one non-transitory storage media of clause 18, further comprising causing the autonomous vehicle to operate along the path for the autonomous vehicle.

Clause 20. The at least one non-transitory storage media of clause 18 or 19, wherein the agent set further comprises a secondary agent set, and wherein the secondary agent set comprises agents unlikely to interact with the autonomous vehicle.

Clause 21. A method for operating an autonomous vehicle, the method comprising: obtaining, by at least one processor, semantic image data associated with an environment in which an autonomous vehicle is operating; determining, by the at least one processor a set of agents in the environment based on the semantic image data; determining, by the at least one processor, a set of secondary agents from the set of agents based on a relative location of a respective secondary agent to a respective object and a set of object semantic behavior data associated with the respective object, wherein the object semantic behavior data comprises logic-based rules and exceptions for safe automotive operation; determining, from the set of agents, a set of primary agents other than secondary agents; generating a path for the autonomous vehicle based on the set of primary agents.

Clause 22. The method of clause 21, further comprising causing the autonomous vehicle to operate along the path for the autonomous vehicle.

Clause 23. The method of clause 21 or 22, wherein the set of agents comprise objects configured to move.

Clause 24. The method of any clauses 21-23, wherein the secondary agent set comprises agents unlikely to interact with the autonomous vehicle.

Clause 25. The method of any clauses 21-24, wherein the secondary agent set comprises agents that will unavoidably interact with the autonomous vehicle.

Clause 26. The method of any clauses 21-25, wherein the secondary agent set comprises an agent disposed on an opposite side of a traffic signal from the autonomous vehicle.

Clause 27. The method of any clauses 21-26, wherein the agents of the secondary agent set are vehicles approaching a traffic signal opposite the autonomous vehicle.

Clause 28. A system, comprising: at least one processor, and at least one non-transitory storage media storing instructions that, when executed by the at least one processor, cause the at least one processor to: obtain, by at least one processor, semantic image data associated with an environment in which an autonomous vehicle is operating; determine, by the at least one processor a set of agents in the environment based on the semantic image data; determine, by the at least one processor, a set of secondary agents from the set of agents based on a relative location of a respective secondary agent to a respective object and a set of object semantic behavior data associated with the respective object, wherein the object semantic behavior data comprises logic-based rules and exceptions for safe automotive operation; determine, from the set of agents, a set of primary agents other than secondary agents; generate a path for the autonomous vehicle based on the set of primary agents.

Clause 29. The system of clause 28, further comprising causing the autonomous vehicle to operate along the path for the autonomous vehicle.

Clause 30. The system of clause 28 or 29, wherein the set of agents comprise objects configured to move.

Clause 31. The system of any of clauses 28-30, wherein the secondary agent set comprises agents unlikely to interact with the autonomous vehicle.

Clause 32. The system of any of clauses 28-31, wherein the secondary agent set comprises agents that will unavoidably interact with the autonomous vehicle.

Clause 33. The system of any of clauses 28-32, wherein the secondary agent set comprises an agent disposed on an opposite side of a traffic signal from the autonomous vehicle.

Clause 34. The system of any of clauses 28-33, wherein the agents of the secondary agent set are vehicles approaching a traffic signal opposite the autonomous vehicle.

Clause 35. At least one non-transitory storage media storing instructions that, when executed by at least one processor, cause the at least one processor to: obtain, by at least one processor, semantic image data associated with an environment in which an autonomous vehicle is operating; determine, by the at least one processor a set of agents in the environment based on the semantic image data; determine, by the at least one processor, a set of secondary agents from the set of agents based on a relative location of a respective secondary agent to a respective object and a set of object semantic behavior data associated with the respective object, wherein the object semantic behavior data comprises logic-based rules and exceptions for safe automotive operation; determine, from the set of agents, a set of primary agents other than secondary agents; generate a path for the autonomous vehicle based on the set of primary agents.

Clause 36. The at least one non-transitory storage media of clause 35, further comprising causing the autonomous vehicle to operate along the path for the autonomous vehicle.

Clause 37. The at least one non-transitory storage media of clause 35 or 36, wherein the set of agents comprise objects configured to move.

Clause 38 The at least one non-transitory storage media of any of clauses 35-37, wherein the secondary agent set comprises agents unlikely to interact with the autonomous vehicle.

Clause 39. The at least one non-transitory storage media of any of clauses 35-38, wherein the secondary agent set comprises agents that will unavoidably interact with the autonomous vehicle.

Clause 40. The at least one non-transitory storage media of any of clauses 35-39, wherein the secondary agent set comprises an agent disposed on an opposite side of a traffic signal from the autonomous vehicle.

Clause 41. A method for operating an autonomous vehicle, the method comprising: obtaining, by at least one processor, semantic image data associated with an environment in which an autonomous vehicle is operating; determining, by the at least one processor, at least one agent in the environment based on the semantic image data; determining a predicted action for the at least one agent; determining an agent predicted path for the at least one agent based on the determined predicted action; determining a vehicle path of the autonomous vehicle; determining a predicted collision of the at least one agent and the autonomous vehicle based on the agent predicted path for the at least one agent and based on a vehicle path of the autonomous vehicle; simulating actions to avoid the predicted collision; categorizing the predicted collision as a primary predicted collision based on the simulating actions; and transmitting operation instructions based on categorizing the predicted collision as the primary predicted collision.

Clause 42. The method of clause 41 wherein the primary predicted collision is a predicted collision that cannot be avoided by the autonomous vehicle at a time of simulation.

Clause 43. The method of clause 41 or 42 wherein taking action is further based on a predicted collision mitigation policy.

Clause 44. The method of any of clauses 41-43, wherein taking action comprises causing the autonomous vehicle to accelerate.

Clause 45. The method of any of clauses 41-44, further comprising transforming the agent predicted path and the vehicle path to a vehicle path progress and time map.

Clause 46. The method of clause 45, wherein determining the predicted collision is based at least in part on the vehicle path progress and time map.

Clause 47. The method of any of clauses 41-46, wherein simulating actions to avoid the predicted collision further comprises at least one of speeding up, slowing down, veering left, and veering right.

Clause 48. A system, comprising: at least one processor, and at least one non-transitory storage media storing instructions that, when executed by the at least one processor, cause the at least one processor to: obtain, by at least one processor, semantic image data associated with an environment in which an autonomous vehicle is operating; determine, by the at least one processor, at least one agent in the environment based on the semantic image data; determine a predicted action for the at least one agent; determining an agent predicted path for the at least one agent based on the determined predicted action; determine a vehicle path of the autonomous vehicle; determine a predicted collision of the at least one agent and the autonomous vehicle based on the agent predicted path for the at least one agent and based on a vehicle path of the autonomous vehicle; simulate actions to avoid the predicted collision; categorize the predicted collision as a primary predicted collision based on the simulating actions; and transmit operation instructions based on categorizing the predicted collision as the primary predicted collision.

Clause 49. The system of clause 48 wherein the primary predicted collision is a predicted collision that cannot be avoided by the autonomous vehicle at a time of simulation.

Clause 50. The system of clause 48 or 49 wherein taking action is further based on a predicted collision mitigation policy.

Clause 51. The system of any of clauses 48-50, wherein taking action comprises causing the autonomous vehicle to accelerate.

Clause 52. The system of any of clauses 48-51, further comprising transforming the agent predicted path and the vehicle path to a vehicle path progress and time map.

Clause 53. The system of clause 52, wherein determining the predicted collision is based at least in part on the vehicle path progress and time map.

Clause 54. The system of any of clauses 48-53, wherein simulating actions to avoid the predicted collision further comprises at least one of speeding up, slowing down, veering left, and veering right.

Clause 55. At least one non-transitory storage media storing instructions that, when executed by at least one processor, cause the at least one processor to: obtain, by at least one processor, semantic image data associated with an environment in which an autonomous vehicle is operating; determine, by the at least one processor, at least one agent in the environment based on the semantic image data; determine a predicted action for the at least one agent; determining an agent predicted path for the at least one agent based on the determined predicted action; determine a vehicle path of the autonomous vehicle; determine a predicted collision of the at least one agent and the autonomous vehicle based on the agent predicted path for the at least one agent and based on a vehicle path of the autonomous vehicle; simulate actions to avoid the predicted collision; categorize the predicted collision as a primary predicted collision based on the simulating actions; and transmit operation instructions based on categorizing the predicted collision as the primary predicted collision.

Clause 56. The at least one non-transitory storage media of clause 55 wherein the primary predicted collision is a predicted collision that cannot be avoided by the autonomous vehicle at a time of simulation.

Clause 57. The at least one non-transitory storage media of clause 55 or 56 wherein taking action is further based on a predicted collision mitigation policy.

Clause 58. The at least one non-transitory storage media of any of clauses 55-57, wherein taking action comprises causing the autonomous vehicle to accelerate.

Clause 59. The at least one non-transitory storage media of any of clauses 55-58, further comprising transforming the agent predicted path and the vehicle path to a vehicle path progress and time map.

Clause 60. The at least one non-transitory storage media of clause 59, wherein determining the predicted collision is based at least in part on the vehicle path progress and time map.

What is claimed is:

1. A method for operating an autonomous vehicle, the method comprising:

obtaining, by at least one processor, semantic image data associated with an environment in which an autonomous vehicle is operating;

determining, by the at least one processor, a plurality of agents in the environment based on the semantic image data;

identifying secondary agents within the plurality of agents, wherein identifying the secondary agents comprises identifying a first secondary agent based on a location of the first secondary agent relative to an object in the environment and identifying a second secondary agent based on a location of the second secondary agent relative to the first secondary agent;

identifying a set of primary agents from the plurality of agents, wherein the set of primary agents are separate from the secondary agents;

determining a plurality of predicted actions for at least one agent from the set of primary agents;

identifying secondary predicted actions within the plurality of predicted actions based on a determined object type of the at least one agent;

filtering the secondary predicted actions from the plurality of predicted actions to determine a set of primary predicted actions, wherein a particular action of the plurality of predicted actions is identified as a secondary predicted action for a first object type and is identified as a primary predicted action for a second object type;

determining an agent predicted path for the at least one agent based on the set of primary predicted actions;

determining a vehicle path of the autonomous vehicle;

determining a predicted collision of the at least one agent and the autonomous vehicle based on the agent predicted path for the at least one agent and based on a vehicle path of the autonomous vehicle;

simulating actions to avoid the predicted collision;

categorizing the predicted collision as a primary predicted collision based on the simulated actions; and transmitting operation instructions associated with taking an action based on categorizing the predicted collision as the primary predicted collision.

2. The method of claim 1, wherein the primary predicted collision is a predicted collision that cannot be avoided by the autonomous vehicle at a time of simulation.

3. The method of claim 1, wherein taking the action is further based on a predicted collision mitigation policy.

4. The method of claim 1, wherein taking the action comprises causing the autonomous vehicle to accelerate.

5. The method of claim 1, further comprising transforming the agent predicted path and the vehicle path to a vehicle path progress and time map.

6. The method of claim 5, wherein determining the predicted collision is based at least in part on the vehicle path progress and time map.

7. The method of claim 1, wherein simulating actions to avoid the predicted collision further comprises at least one of speeding up, slowing down, veering left, and veering right.

8. The method of claim 1, wherein the identifying the secondary agents further comprises identifying based at least in part on the semantic image data and contextual data associated with a scene corresponding to the semantic image data, wherein the contextual data comprises one or more of: an indication of a position of an agent relative to the autonomous vehicle; an indication of the position of the agent relative to a traffic light; an indication of the position of the agent relative to a traffic sign; an indication of a status of the traffic light; an indication of a type of the traffic sign; an indication of a distance of the agent relative to the autonomous vehicle; an indication of a mobility characteristic of the agent; an indication of a pose of the agent relative to the autonomous vehicle; a speed to the agent; or an indication of a position of the agent relative to an obstacle.

9. The method of claim 8, wherein an agent from the plurality of agents is identified as a secondary agent based at least in part on whether the contextual data indicates that one or more characteristics of the agent satisfies a threshold.

10. A system, comprising:

at least one processor, and at least one non-transitory storage media storing instructions that, when executed by the at least one processor, cause the at least one processor to:

obtain, by the at least one processor, semantic image data associated with an environment in which an autonomous vehicle is operating;

determine, by the at least one processor, a plurality of agents in the environment based on the semantic image data;

identify secondary agents within the plurality of agents, wherein identifying secondary agents comprises identifying a first secondary agent based on a location of the first secondary agent relative to an object in the environment and identifying a second secondary agent based on a location of the second secondary agent relative to the first secondary agent;

identify a set of primary agents from the plurality of agents comprising primary agents, wherein the set of primary agents are separate from the secondary agents;

determine a plurality of predicted actions for at least one agent from the set of primary agents;

identify, secondary predicted actions within the plurality of predicted actions based on a determined object type of the at least one agent;

filter the secondary predicted actions from the plurality of predicted actions to determine a set of primary predicted actions wherein a particular action of the plurality of predicted actions is identified as a secondary predicted action for a first object type and is identified as a primary predicted action for a second object type;

determine an agent predicted path for the at least one agent based on the set of primary predicted actions;

determine a vehicle path of the autonomous vehicle;

determine a predicted collision of the at least one agent and the autonomous vehicle based on the agent predicted path for the at least one agent and based on a vehicle path of the autonomous vehicle;

simulate actions to avoid the predicted collision;

categorize the predicted collision as a primary predicted collision based on the simulated actions; and transmit operation instructions associated with taking an action based on categorizing the predicted collision as the primary predicted collision.

11. The system of claim 10, wherein the primary predicted collision is a predicted collision that cannot be avoided by the autonomous vehicle at a time of simulation.

12. The system of claim 10, wherein taking the action is further based on a predicted collision mitigation policy.

13. The system of claim 10, wherein taking the action comprises causing the autonomous vehicle to accelerate.

14. The system of claim 10, further comprising transforming the agent predicted path and the vehicle path to a vehicle path progress and time map.

15. The system of claim 14, wherein determining the predicted collision is based at least in part on the vehicle path progress and time map.

16. The system of claim 10, wherein simulating actions to avoid the predicted collision further comprises at least one of speeding up, slowing down, veering left, and veering right.

17. At least one non-transitory storage media storing instructions that, when executed by at least one processor, cause the at least one processor to perform operations comprising:

obtaining, by the at least one processor, semantic image data associated with an environment in which an autonomous vehicle is operating;

determining, by the at least one processor, a plurality of agents in the environment based on the semantic image data;

identifying secondary agents within the plurality of agents, wherein identifying the secondary agents comprises identifying a first secondary agent based on a location of the first secondary agent relative to an object in the environment and identifying a second secondary agent based on a location of the second secondary agent relative to the first secondary agent;

identify a set of primary agents from the plurality of agents comprising primary agents, wherein the set of primary agents are separate from the secondary agents;

determining a plurality of predicted actions for at least one agent from the set of primary agents;

identifying secondary predicted actions within the plurality of predicted actions based on a determined object type of the at least one agent;

filtering the secondary predicted actions from the plurality of predicted actions to determine a set of primary predicted actions, wherein a particular action of the plurality of predicted actions is identified as a secondary predicted action for a first object type and is identified as a primary predicted action for a second object type;

determining an agent predicted path for the at least one agent based on the set of primary predicted actions;

determining a vehicle path of the autonomous vehicle;

determining a predicted collision of the at least one agent and the autonomous vehicle based on the agent predicted path for the at least one agent and based on a vehicle path of the autonomous vehicle;

simulating actions to avoid the predicted collision;

categorizing the predicted collision as a primary predicted collision based on the simulated actions; and transmitting operation instructions associated with taking an action based on categorizing the predicted collision as the primary predicted collision.

18. The at least one non-transitory storage media of claim 17, wherein taking the action is further based on a predicted collision mitigation policy, and wherein at least one predicted collision mitigation policy includes causing the autonomous vehicle to accelerate.

19. The at least one non-transitory storage media of claim 17, further comprising transforming the agent predicted path and the vehicle path to a vehicle path progress and time map.

20. The at least one non-transitory storage media of claim 19, wherein determining the predicted collision is based at least in part on the vehicle path progress and time map.

* * * * *